(12) United States Patent
Honey et al.

(10) Patent No.: US 12,114,584 B2
(45) Date of Patent: Oct. 15, 2024

(54) AGRICULTURAL IMPLEMENT WITH TINE ASSEMBLY

(71) Applicant: HONEY BEE MANUFACTURING LTD., Frontier (CA)

(72) Inventors: Glenn Raymond Honey, Bracken (CA); Lee Glenn Harper, Shaunavon (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 584 days.

(21) Appl. No.: 17/085,482

(22) Filed: Oct. 30, 2020

(65) Prior Publication Data

US 2022/0132719 A1    May 5, 2022

(51) Int. Cl.
*A01B 23/02* (2006.01)
*A01B 19/02* (2006.01)
*A01B 63/00* (2006.01)
*A01B 63/26* (2006.01)

(52) U.S. Cl.
CPC .............. *A01B 23/02* (2013.01); *A01B 19/02* (2013.01); *A01B 63/008* (2013.01); *A01B 63/26* (2013.01)

(58) Field of Classification Search
CPC ......... A01B 19/00; A01B 19/02; A01B 23/02; A01B 35/02; A01B 35/06; A01B 35/08; A01B 35/20; A01B 35/22; A01B 35/24; A01B 35/26; A01B 39/20; A01B 39/22; A01B 63/004; A01B 63/008;
(Continued)

(56) References Cited

U.S. PATENT DOCUMENTS

| 1,634,650 | A | 7/1927 | Coon |
| 1,900,440 | A | 3/1933 | Ferguson |
| 2,349,257 | A | 5/1944 | Evans et al. |

(Continued)

FOREIGN PATENT DOCUMENTS

| AT | 517211 A4 | 12/2016 |
| CA | 2007011 A1 | 7/1991 |

(Continued)

OTHER PUBLICATIONS

Gearmore Inc., Offset Discs Pull Type Assembly, Operation, & Parts Manual for Models Series 700, Jul. 2012, 23 pages.

*Primary Examiner* — Jamie L McGowan
*Assistant Examiner* — Audrey L Lusk

(57) ABSTRACT

An agricultural implement assembly, which may comprise a support frame and a tine support structure for supporting a plurality of tine members. The assembly may comprise a clamping mechanism operable for securing the tine members to the tine support structure. The clamping mechanism comprises an upper clamping arm, a lower clamping arm and a medial connecting member which are operable to securely hold or otherwise constrain the tine members against or in close proximity to the tine support structure. The clamping mechanism may comprise a tine angled portion engaging component operable to engage an upper surface of the angled end portion of the tine member. The upper and lower clamping arms may comprise at least one upper ridge and at least one lower ridge for engaging in contact with a first portion and a second portion respectively of outward facing surface regions of the tine support structure.

55 Claims, 33 Drawing Sheets

(58) Field of Classification Search
CPC ..... A01B 63/023; A01B 63/24; A01B 63/245; A01B 63/26; F16B 2/065; Y10T 403/7067; A01D 80/02
USPC ....... 172/646, 649, 654, 655, 656, 663, 734, 172/763
See application file for complete search history.

(56) References Cited

U.S. PATENT DOCUMENTS

| | | | |
|---|---|---|---|
| 2,440,550 A | | 4/1948 | Martin |
| 2,493,811 A | | 1/1950 | Graham |
| 2,507,783 A | | 5/1950 | Graham |
| 2,562,486 A | | 7/1951 | Denning |
| 2,584,614 A | | 2/1952 | Rasmussen et al. |
| 2,595,352 A | | 5/1952 | Graham |
| 2,663,239 A | | 12/1953 | Rapp et al. |
| 2,699,715 A | | 1/1955 | Shelton |
| 2,701,511 A | | 2/1955 | Graham |
| 2,719,474 A | | 10/1955 | Lindeman |
| 2,759,313 A | | 8/1956 | Campbell |
| 2,857,833 A | | 10/1958 | Rolf |
| 3,066,470 A | * | 12/1962 | Johnston ................ A01D 80/02 56/400 |
| 3,425,755 A | * | 2/1969 | Harris .................... A01B 35/22 403/396 |
| 3,460,632 A | | 8/1969 | Richey |
| 3,827,505 A | * | 8/1974 | Sosalla ................ A01B 23/02 403/395 |
| 4,465,396 A | * | 8/1984 | Meinert ................ A01B 23/02 403/395 |
| 5,957,218 A | | 9/1999 | Noonan et al. |
| 6,085,846 A | | 7/2000 | Buchl et al. |
| 6,223,832 B1 | | 5/2001 | Hook et al. |
| 8,235,130 B2 | | 8/2012 | Henry et al. |
| 8,453,754 B2 | | 6/2013 | Beaujot |
| 8,914,198 B2 | | 12/2014 | Prickel et al. |
| 8,997,886 B2 | | 4/2015 | Stark |
| 9,585,298 B2 | | 3/2017 | Henry et al. |
| 2006/0214073 A1 | * | 9/2006 | Mominee ................ F16B 2/065 248/226.11 |
| 2011/0112721 A1 | | 5/2011 | Wang et al. |
| 2011/0284253 A1 | | 11/2011 | Stevenson |
| 2015/0129261 A1 | | 5/2015 | Sudbrink et al. |
| 2016/0273865 A1 | * | 9/2016 | Banes .................... F16M 13/02 |
| 2018/0368307 A1 | | 12/2018 | Honey et al. |
| 2020/0113115 A1 | | 4/2020 | Honey et al. |
| 2020/0113116 A1 | | 4/2020 | Honey et al. |

FOREIGN PATENT DOCUMENTS

| | | |
|---|---|---|
| CA | 2753800 A1 | 9/2012 |
| CA | 2881762 A1 | 8/2016 |
| DE | 10011102 B4 | 11/2005 |
| EP | 0776597 B1 | 4/2002 |
| GB | 1042967 A | 9/1966 |
| GB | 1271308 A | 4/1972 |

\* cited by examiner

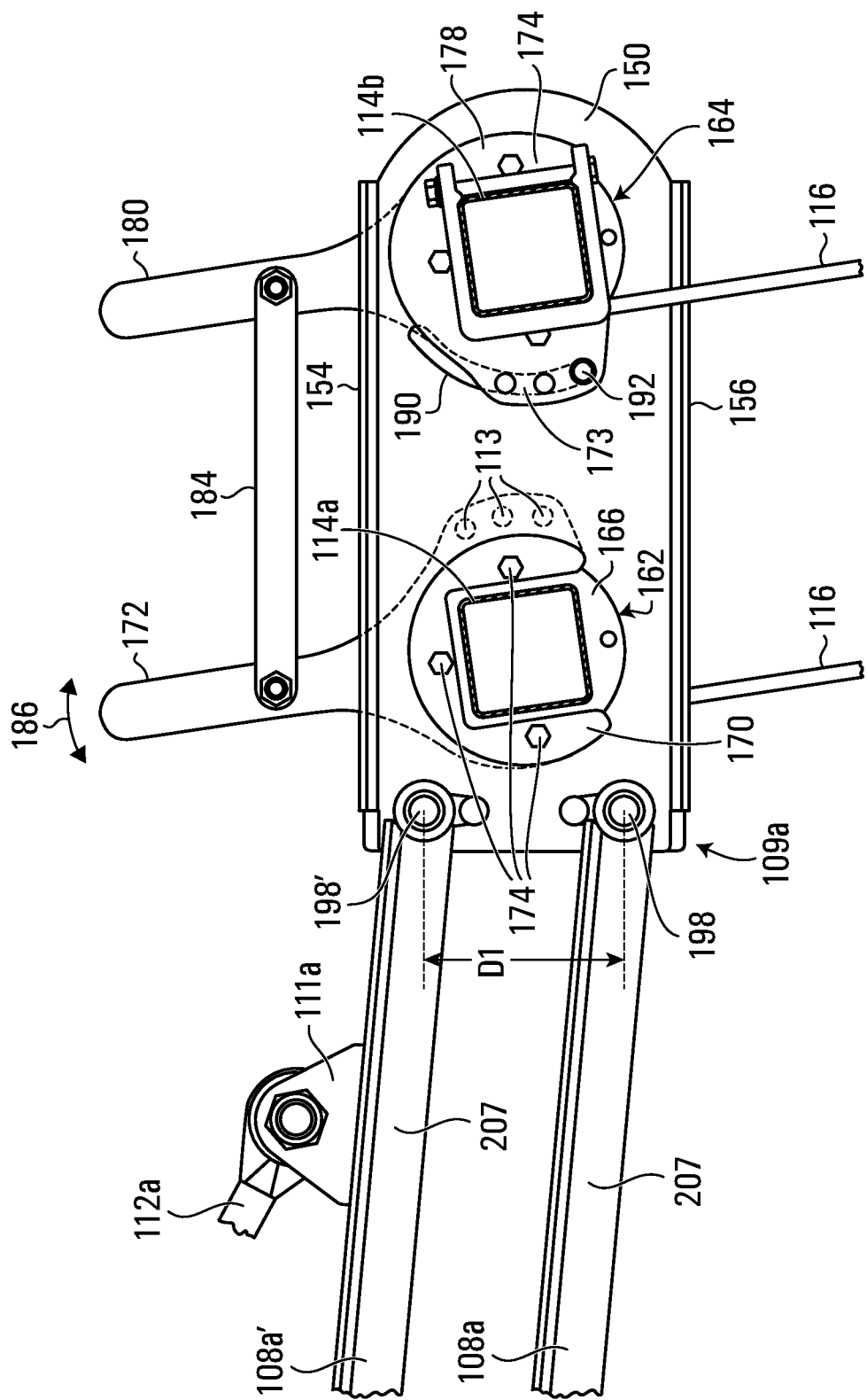

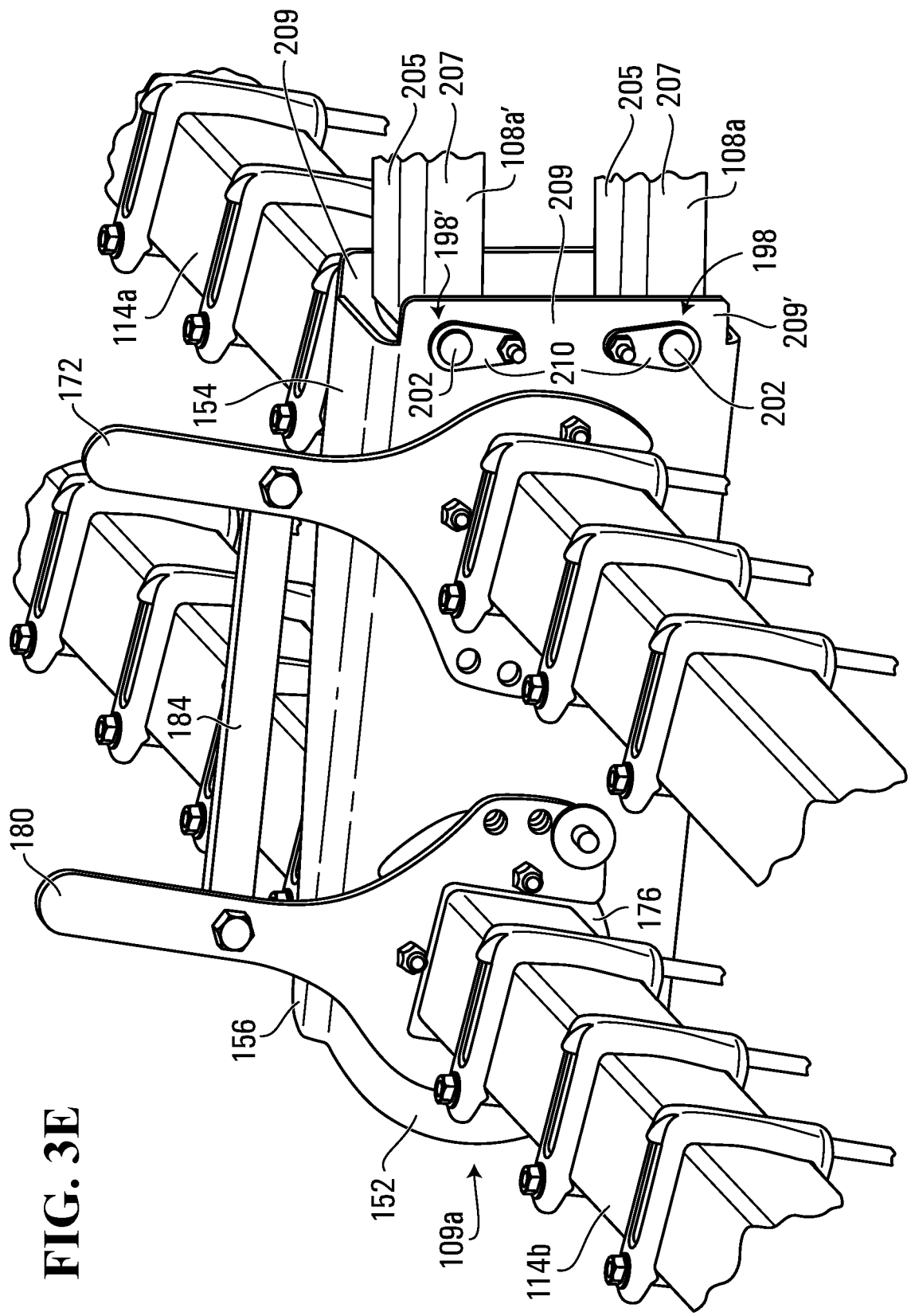

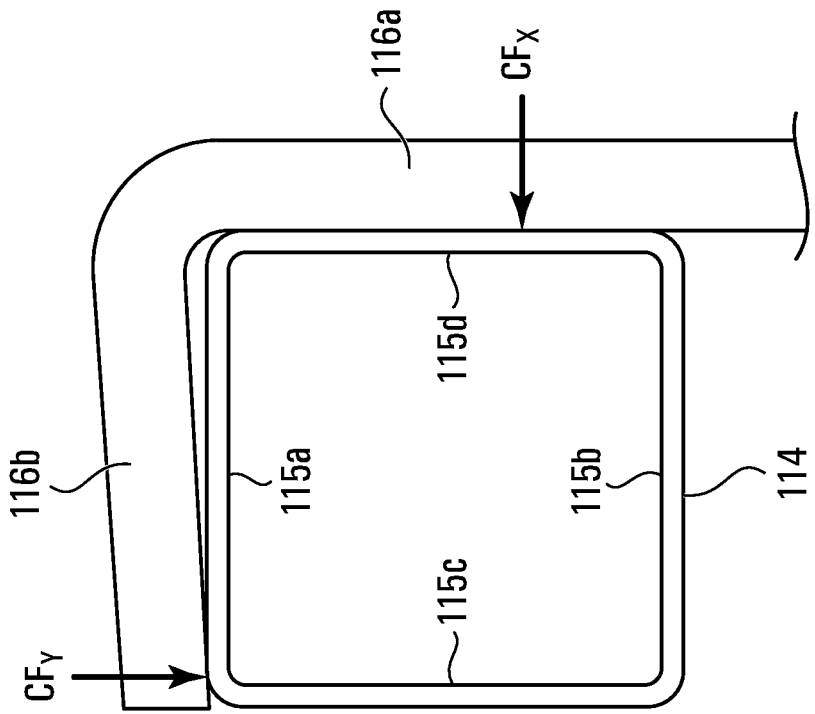
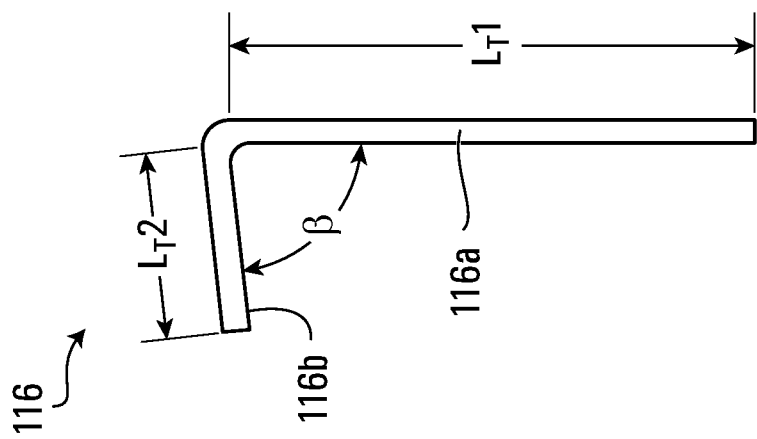
FIG. 4B
FIG. 4A

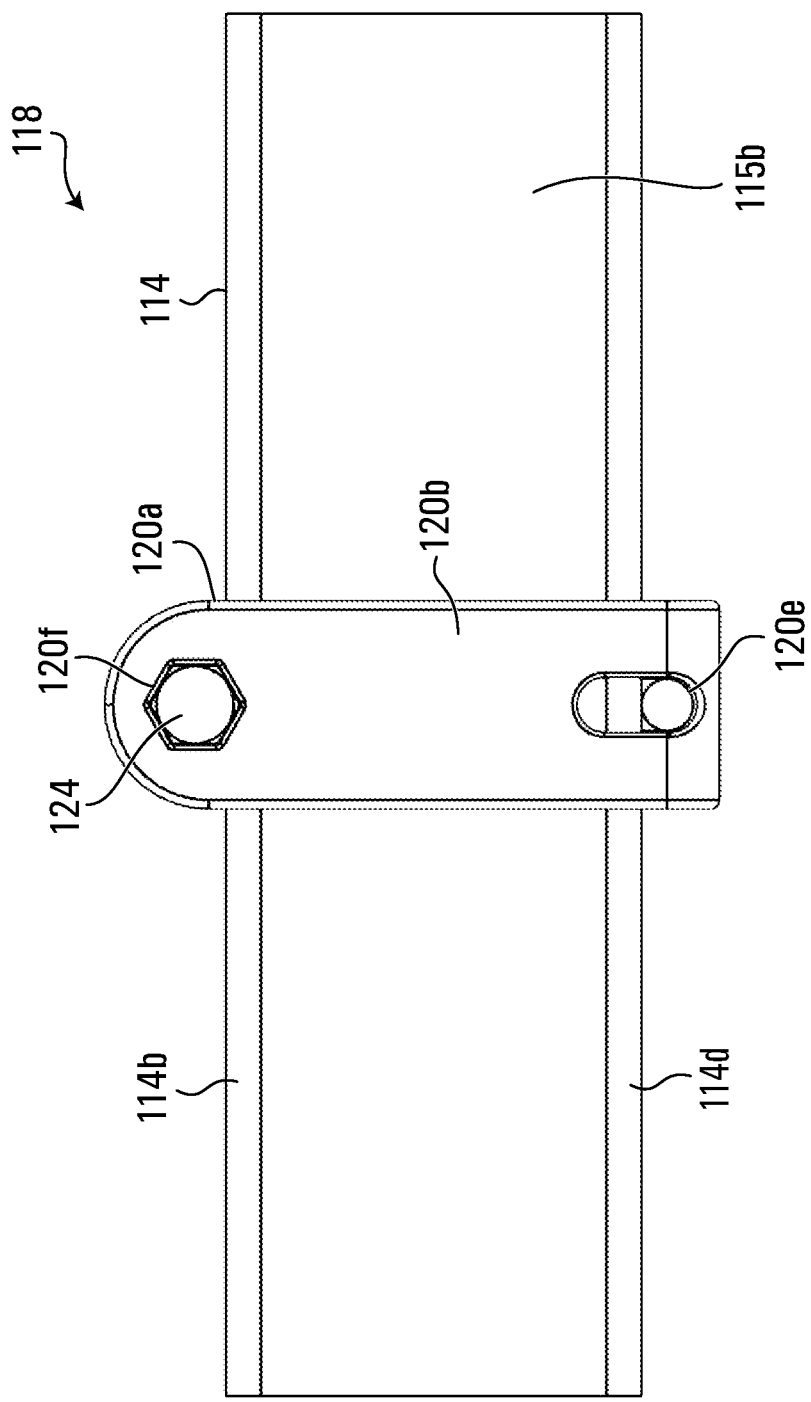

AGRICULTURAL IMPLEMENT WITH TINE ASSEMBLY

TECHNICAL FIELD

The present invention relates to agricultural implements, including a tine assembly including an apparatus for securing a tine to a support structure.

BACKGROUND

Farmers use a variety of agricultural implements in order to provide a level seedbed of a consistent depth for seeding. For instance, a farmer may initially work on a field with a v-chisel, chisel plow or disk implement to loosen and break compacted soil. The farmer may then work the field with an implement having a plurality of S-tines, C-shanks, or other blades to further mix the soil and attempt to break down some of the larger soil clods. Subsequently, other implements may be used on the field to prepare it for planting.

When using an agricultural implement that includes a plurality of tines (eg. a tine harrow), the agricultural implement and the tines thereof, will typically be subject to various forces as it bounces and rocks as the agricultural implement moves across the field. In such an agricultural implement, it can be challenging to securely mount each of the tines to a support member. An apparatus for mounting tines to a support structure is disclosed in Canadian patent application serial no. 2881762 which was laid open for public inspection on Jul. 10, 2016, the entire contents of such application is incorporated herein in its entirety. However, improvements to such apparatuses are desirable.

SUMMARY

In an aspect of the disclosure, there is provided an agricultural implement assembly including a support frame including an elongated tine support structure and a tine member including an elongated body portion and an angled end portion. The angled end portion and an upper region of the elongated body portion of the tine member are configured at an interior angle of between 85 degrees and 95 degrees to each other. The tine support structure has at least three side surfaces that are oriented at approximately 90 degrees to each other. The angled end portion of the tine member is configured to be held against or in close proximity to the tine support structure at an upper side surface of the three side surfaces of the tine support structure. The upper region of the elongated body portion of the tine member is configured to be held against or in close proximity to the tine support structure at an inner side surface of the three side surfaces of the tine support structure. The assembly also includes a clamping mechanism operable for securing the tine member to the tine support structure, the clamping mechanism including an upper clamping arm, a lower clamping arm and a medial connecting member interconnecting an end portion of the upper clamping arm and an end portion of the lower clamping arm. The upper clamping arm, the lower clamping arm and the medial connecting member is configured for receiving a portion of the tine support structure there between. The upper clamping arm includes a pair of spaced longitudinally extending wall portions forming a longitudinally extending first channel there between, the first channel being open on at least an upper side and configured to receive the angled end portion of the tine member therein. The medial connecting portion is configured with a second vertically extending channel configured for receiving the elongated body portion of the tine member there through and retaining the upper region of the elongated body portion therein. The lower clamping arm has a first opening there through located proximate the connection of the end portion of the lower clamping arm to the medial connecting portion. The first and second channels are in communication with each other. The angled end portion of the tine member extends within the first channel and the upper region of the elongated body portion of the tine member extends within the second channel and the elongated body portion extends through the first opening in the lower clamping arm. The assembly also includes a clamp tightening mechanism operable to exert a clamping force between the upper and lower clamping arms and a tine angled portion engaging component operable to engage an upper surface of the angled end portion of the tine member. The tine member is operable to be securely held or is otherwise constrained by the clamping mechanism against or in close proximity to the tine support structure at both the upper surface and the inward side surface of the tine support structure. The upper and lower clamping arms comprise at least one upper ridge and at least one lower ridge located on an inner surface of each of the respective upper and lower clamping arms, the for at least one upper ridge and at least one lower ridge engaging in contact with a first portion and a second portion respectively of outward facing surface regions of the tine support structure.

In another aspect there is provided a clamping apparatus operable for securing a tine member to a support structure, the tine member having an upper angled portion and an elongated body portion oriented at an interior angle to the angled portion. The interior angle is approximately 90 degrees. The clamping mechanism includes a generally c-shaped structure configured for accommodating a portion of the tine support structure there between, an upper arm of the c-shaped structure including an open top, elongated channel for constraining the angled portion of the tine member therein, a medial connecting portion including a channel configured for constraining an upper region of the elongated body portion of the tine member therein. The lower arm of the c-shaped structure including an aperture for receiving the elongated body portion there through. The clamping mechanism also includes at least one upper ridge and at least one lower ridge located on inner surfaces of an respective upper arm of the c-shaped structure and a lower arm of the c-shaped structure, respectively. The at least one upper ridge and at least one lower ridge operable for locking engagement with upper and lower rear corner regions of the tine support structure. The clamping mechanism also includes a clamp tightening mechanism operable to exert a clamping force between the upper and lower arms. The upper and lower ridges are operable to hold the c-shaped structure and the tine member on the support structure without the presence of the clamp tightening mechanism.

In another aspect there is provided an agricultural implement assembly including a support frame including an elongated tine support structure and a tine member including an elongated body portion and an angled end portion. The angled end portion and an upper region of the elongated body portion of the tine member are configured at an interior angle of between 85 degrees and 95 degrees to each other. The tine support structure has three side surfaces that are oriented at approximately 90 degrees to each other. The angled end portion of the tine member is configured to be held against or in close proximity to the tine support structure at an upper side surface of the three side surfaces of the tine support structure and the upper region of the elongated body portion of the tine member is configured to be held against or in close proximity to the tine support structure at an inner side surface of the three side surfaces of the tine support structure. The assembly also includes a clamping mechanism operable for securing the tine member to the tine support structure. The clamping mechanism includes an upper clamping arm, a lower clamping arm and a medial connecting member interconnecting an end portion of the upper clamping arm and an end portion of the lower clamping arm. The upper clamping arm, the lower clamping arm and the medial connecting member define a space configured for receiving a portion of the tine support structure therein. The upper clamping arm includes a pair of spaced longitudinally extending portions forming a longitudinally extending first channel there between, the first channel being open on at least an upper side configured to receive the angled end portion of the tine member therein. The medial connecting portion is configured with a second vertically extending channel configured for receiving the elongated body portion of the tine member there through and retaining the upper region of the elongated body portion therein. The lower clamping arm has a first opening there through located proximate the connection of the end portion of the lower clamping arm to the medial connecting portion. The first and second channels are in communication with each other. The angled end portion of the tine member is received within and extends within the first channel. The upper region of the elongated body portion of the tine member extends within the second channel and the elongated body portion extends through the second opening in the lower clamping arm. The assembly also includes a clamp tightening mechanism operable to exert a clamping force between the upper and lower clamping arms. The tine member is operable to be securely held or is otherwise constrained by the clamping mechanism against or in close proximity to the tine support structure at both the upper surface and the inward side surface of the tine support structure. The clamping apparatus also includes a channel end wall positioned at a junction area of the first channel and the second channel and the channel end wall extending over a portion of the first channel at the junction area and the channel end wall being operable to engage an upper surface region of the tine member to apply a downward force on, or otherwise constrain, the tine member to retain the angled end portion within the first channel.

In another aspect there is provided a clamping apparatus for securing a tine of an agricultural implement. The agricultural implement includes a support frame including at least one transversely extending tine support structure on the support frame and a tine member including an elongated body portion and an angled end portion. The angled end portion and an upper region of the elongated body portion of the tine member are configured at an interior angle of between 85 degrees and 95 degrees to each other. The tine support structure has at least three side surfaces that are oriented at approximately 90 degrees to each other. The angled end portion of the tine member is configured to be positioned above the tine support structure on an upper surface of the at least three side surfaces of the tine support structure. The clamping apparatus for securing the tine to the tine support structure includes an upper clamping arm, a lower clamping arm and a medial connecting portion interconnecting an end portion of the upper clamping arm and an end portion of the lower clamping arm. The upper clamping arm includes a first channel that is generally open on an upper side. The medial connecting portion configured with a second channel. The lower clamping arm has a first opening there through located proximate the connection of the end portion of the lower clamping arm to the medial connecting portion. The lower clamping arm includes a second opening there through proximate a distal end portion of the lower clamping arm. The first and second channels are in communication with each other. In operation, the angled end portion of the tine member is received within and extends within the first channel. The upper region of the elongated body portion of the tine member extends within the second channel and the elongated body portion extends through the second opening in the lower clamping arm. The clamping apparatus also includes a clamping bolt that extends through the second opening in the lower clamping arm to and through an end portion in the second channel and a clamping nut affixed at an end of the clamping bolt. The clamping nut has a head portion that engages an upper surface of an end portion of the angled portion of the tine located proximate the distal end of the first channel. At least a lower portion of second opening in the lower clamping arm has an hexagonal cross section and includes an opening tapered surface area which provides a recess that tapers inwards towards a top surface of the lower clamping arm. The opening taper surface corresponds in shape with a tapered surface of the head portion of the clamping nut, the tapered surface of the second opening frictionally interfacing with the tapered head portion to be operable to assist in retaining the clamping bolt in the second opening when the clamping nut is not present on the clamping bolt.

In another aspect there is provided an agricultural implement assembly including a support frame, first and second transversely oriented and extending, longitudinally spaced, tine support structures. The first and second tine support structures are interconnected to the support frame at a fixed longitudinal spaced relationship to each other. The assembly also includes a plurality of tine members interconnected to and depending down from each of the first and second tine support structures and a tine support structure positioning apparatus including a tine support structure spacing apparatus interconnecting the first and second tine support structures in fixed longitudinal spaced relationship to each other. The tine support structure spacing apparatus also includes a first longitudinal extending connecting member fixedly and pivotally inter-connected at a first pivotal connection to the support frame proximate a first end of the first longitudinal extending connecting member. The first longitudinal member is also fixedly and pivotally inter-connected at a second pivotal connection to the spacing apparatus proximate a second end of first longitudinal extending connecting member that is opposite to the first end. The tine support structure spacing apparatus also includes a second longitudinal extending connecting member fixedly and pivotally connected at a third pivotal connection to the support frame proximate a first end of the second longitudinal extending connecting member. The second longitudinal member is also fixedly and pivotally connected at a fourth pivotal connection to the spacing apparatus proximate a second end of the second longitudinal extending connecting member that is opposite to the first end. The first longitudinal connecting member is held in generally parallel relation to the second longitudinal connecting member during vertical movement of the tine support structure spacing apparatus and the first and second tine support structures interconnected thereto. The tine support structure spacing apparatus includes a generally longitudinally and vertically oriented body having a first opening for receiving the first tine support structure therethrough in a transverse orientation and the plate member having a second opening for receiving the second tine support structure therethrough in a transverse orientation.

In another aspect there is provided an agricultural implement assembly including a support frame and first and second transversely oriented and extending, longitudinally spaced, tine support structures. The first and second tine support structures are interconnected to the support frame at a fixed longitudinal spaced relationship to each other. The assembly also includes a plurality of tine members interconnected to and depending down from each of the first and second tine support structures and a tine support structure positioning apparatus including a tine support structure spacing apparatus interconnecting the first and second tine support structures in fixed longitudinal spaced relationship to each other. The tine support structure positioning apparatus also includes a vertical positioning apparatus operable to move the tine support structure spacing apparatus and the first and second tine support structures vertically upwards and downwards without changing the relative vertical positions of the tine support structure spacing apparatus and the first and second tine support structures relative to each other. The tine support structure spacing apparatus includes a generally longitudinally and vertically oriented plate having a first opening for receiving the first tine support structure therethrough in a transverse orientation and the plate member having a second opening for receiving the second tine support structure therethrough in a transverse orientation. The tine support structure spacing apparatus also includes a first rotation adjustment mechanism operable to adjustably rotate the rotational angle of the first tine support structure within the first opening. The spacing apparatus includes a second rotation adjustment mechanism operable to adjustably rotate the rotational angle of the second tine support structure within the second opening. The first rotation adjustment mechanism is operationally connected to the second rotation adjustment mechanism such that operationally adjusting the first rotation adjustment mechanism automatically adjusts the second rotation adjustment mechanism. In operation, adjusting a rotational angle of the first tine support structure within the first opening with the first rotation adjustment mechanism causes the second rotation adjustment mechanism the to adjust the rotational angle of the second tine support structure within the second opening.

BRIEF DESCRIPTION OF THE DRAWINGS

In the figures, which illustrate example embodiments:

FIGS. 3B and 3C are side views of part of the harrow apparatus of FIG. 3A.

FIG. 3E are is a right front side perspective view of part of the harrow apparatus of FIG. 3A.

FIG. 4A is a side view of a representative tine comprising part of the harrow apparatus of 3A.

FIG. 4B is a cross sectional view of a tine in contact with a support structure of the harrow apparatus of FIG. 3A.

FIGS. 5A to 5E are perspective, top, rear, front and bottom views, respectively of a first embodiment of clamping assembly for clamping tines to the support structure in the harrow apparatus of FIG. 3A.

DETAILED DESCRIPTION

Figure 1:
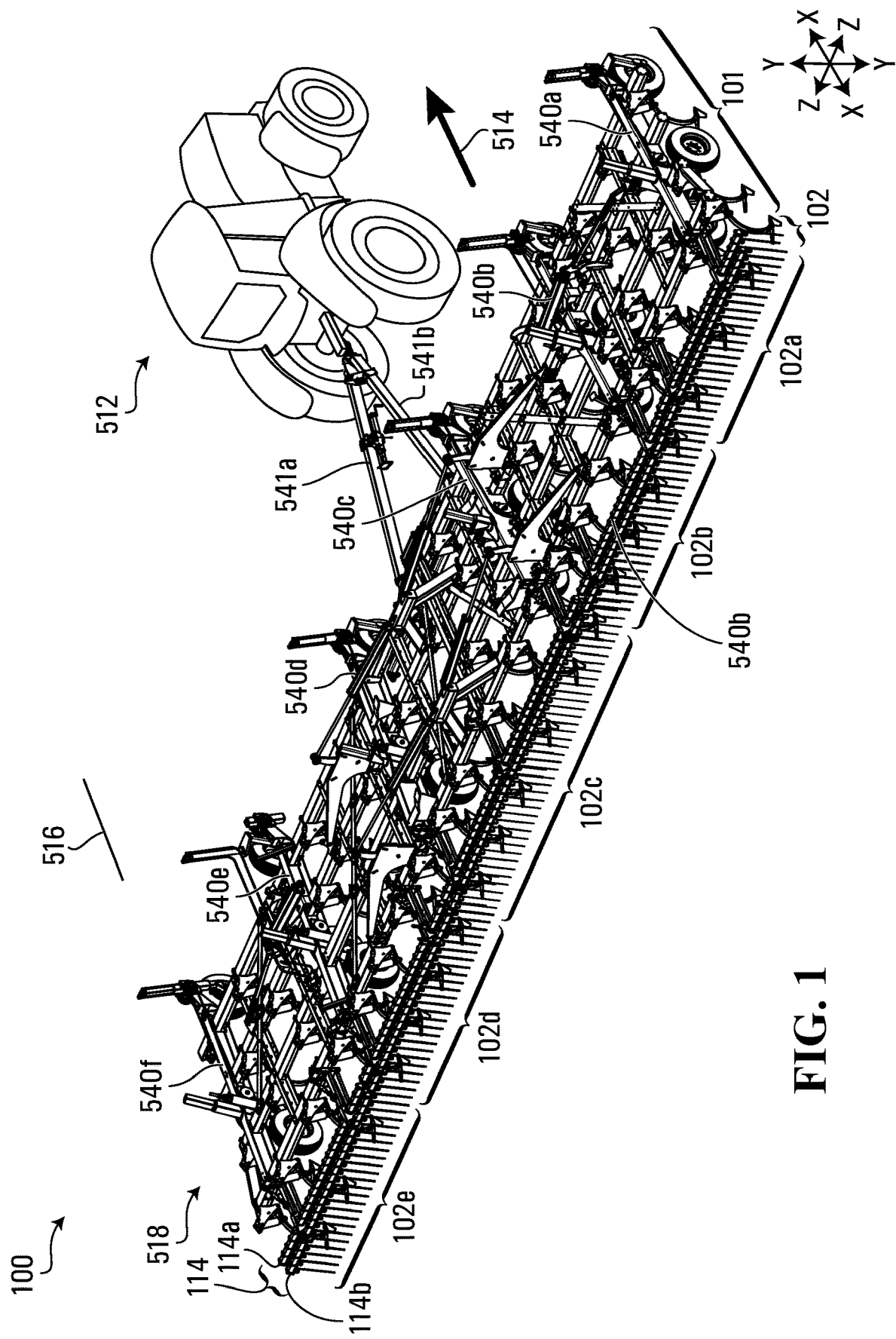
FIG. 1 is a perspective view of a combination of a tillage apparatus, harrow apparatus and propulsion apparatus.

Referring to FIG. 1, an agricultural implement 100 is illustrated. The front portion of implement 100 may consist of a chisel plow 101 and the rearward portion may consist of a tine harrow apparatus 102. In operation, agricultural implement 100 can be pulled behind a propulsion unit 512 (such as a tractor) in a direction of travel denoted by arrow 514 across a field surface 516 and engage with and/or condition the surface 516 as it is moved in the direction of travel.

Figure 2:
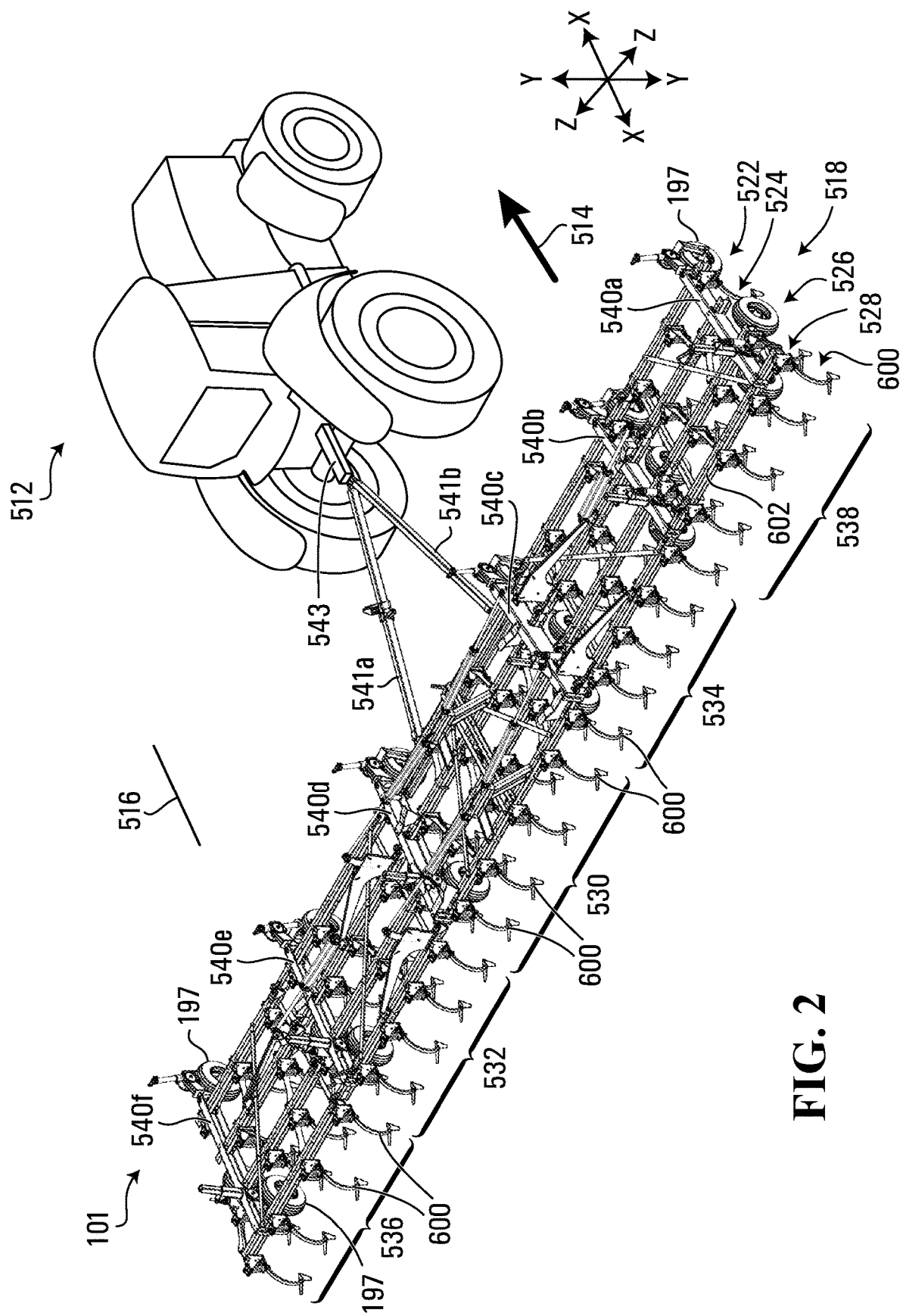
FIG. 2 is a perspective view of a combination of a tillage apparatus and propulsion apparatus.

Referring to FIG. 2, the chisel plow 101 (shown without the tine harrow 102 attached thereto) may include a frame 518 including rows 522, 524, 526, and 528 of transversely oriented open channel structural support members (such as I-Beam members) interconnected by longitudinally oriented open channel structural members 540*a*-540*f* to form a generally rectangular grid configuration. Frame 518 may include a central section 530, left and right inner sections 532 and 534, and left and right outer sections 536 and 538. The sections 530, 532, 534, 536, 538 may be interconnected to each other in a transversely extending configuration. A pair of connecting members 541*a*, 541*b* may be arranged in a generally V-shape with the apex where members 541a, 541b join, being connected to a hitch 543 on propulsion unit 512. The opposite spaced ends of members 541a, 541b are connected to a transversely oriented front member of central section 530 of chisel plow 101.

Referring again FIG. 2, frame 518 of chisel plow 101 may include pivotal connectors in each row to permit pivoting about longitudinal axes: between the central section 530 and the left and right inner sections 532 and 534: and between the respective left and right inner sections 532 and 534 and the left and right outer sections 536 and 538. Each of the pivotal connectors may facilitate a pivotal connection between adjacent transversely oriented open support members such that the adjacent support open members are operable to pivot relative to each other to orientations generally parallel to a contour of the surface 516 when the chisel plow 101 is moved across an uneven surface 516. Additionally, the right inner and outer sections 534, 538 may be pivoted towards central section 530 to a storage and/or transportation position which may be facilitated by a hydraulic piston actuating system controlled by an operator. Similarly, the left inner and outer sections 532, 536 may be pivoted towards central section 530 to a storage and/or transportation position, which may also be facilitated by the hydraulic piston actuating system controlled by an operator.

Chisel plow 101 may also include one or more ground engagers coupled to each of the transversely oriented open members. One of the types of possible ground engagers is denoted at 600 in FIG. 2 for exemplary purposes. In the embodiment shown, the ground engagers 600 include chisel plows. Each of the ground engagers is coupled to at least one upper and/or lower flange of one of the open members in the rows 522, 524, 526, and 528 and configured to engage the surface 516 when the chisel plow 101 is moved across the surface 516. Each ground engager 600 may be coupled to a transversely extending open support member 602 (using a conventional connection device) included in the row of open members 528.

Figure 3A:
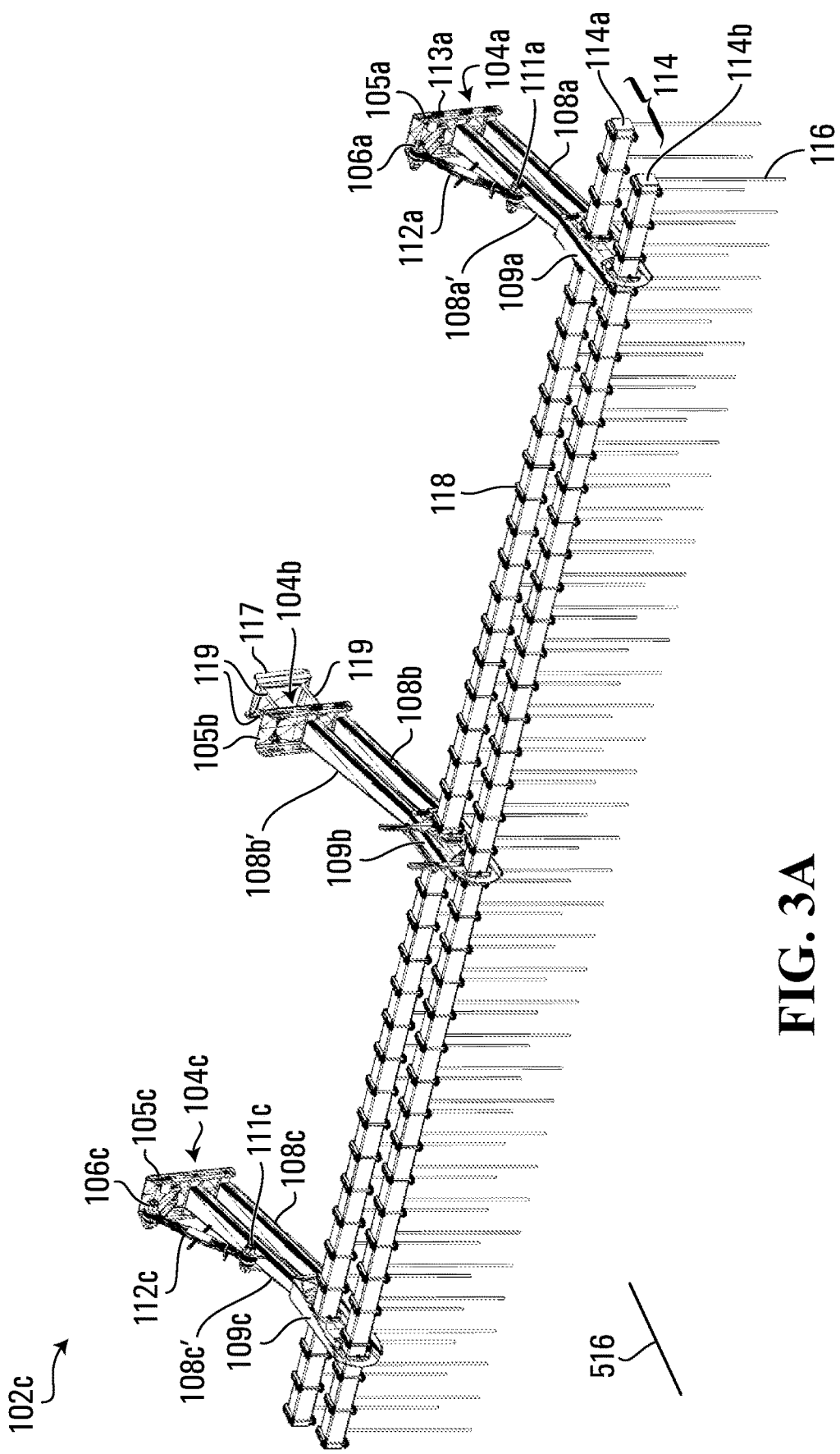
FIG. 3A is a perspective view of the harrow apparatus of FIG. 1.

Interconnected to a rear side of chisel plow 101 is a tine harrow apparatus 102, a representative tine harrow section 102c of which is shown in more detail in FIG. 3A. Tine harrow apparatus 102 may function to "finish" the soil so as to provide a finer finish on the soil topology (eg. smaller sized clumps of soil than would result just from a disk or chisel plow). Each of sections 530, 532, 534, 536, 538 of chisel plow 101 may have a respective tine harrow section 102a, 102b, 102c, 102d, and 102e rearwardly connected thereto, and each tine harrow section 102a, 102b, 102c, 102d, and 102e may be configured to be able to rotate about respective longitudinal pivot axes of chisel plow sections 530, 532, 534, 536, 538. Thus, when each of chisel plow sections 530, 532, 534, 536, 538 rotates about respective longitudinal axes, the tine harrow sections 102a, 102b, 102c, 102d, and 102e connected thereto may rotate with the chisel plow section that it is connected to. Tine harrow sections 102a, 102b, 102c, 102d, and 102e may be pivotally interconnected to each other and may be arranged in a transversely extending orientation as depicted in FIG. 1.

With reference to FIG. 1 and FIG. 3A (illustrating representative tine harrow section 102c), each tine harrow section 102a, 102b, 102c, 102d, and 102e of tine harrow apparatus 102 may include transversely oriented tine support structures 114, in particular front and rear tine support structures 114a and 114b respectively. Mounted to each of tine support structures 114a, 114b may be a plurality of transversely spaced tines 116, each being secured to one of the transversely extending supporting structures 114a, 114b by a clamping assembly 118. Both front and rear tine support structures 114a, 114b respectively may be pivotally movable about a transverse axis, as will be explained further below. Tine support members 114 may be rectangular or square in cross section and may be formed as a hollow tube (eg. an "HSS" member) or may be a solid member and may be made from any suitably strong material such as a suitable type/grade of steel. In some embodiments, support structure 114 might have a cross section of another shape such as a C-shape or any shape that includes a partially square or rectangular cross section suitable to be accommodated by clamping assembly 118.

In another embodiment (not shown), tine harrow apparatus 102 may be configured in a manner that permits it to be coupled directly to the hitch 543 of propulsion unit 512. For example, tine harrow apparatus 102 may include its own support frame assembly which might be similar to the support frame for chisel plow 101, and may be towed as a standalone unit or as a mounted implement.

Front and rear tine support structures 114a, 114b may be linked by stationary support plates/tine support structure spacing apparatuses 109a, 109b, 109c, and held in transversely extending, a fixed longitudinally spaced, parallel relation to each other. Longitudinally extending left, central and right connecting, transversely spaced pairs of upper and lower support/connecting members 108a, 108a'; 108b, 108b'; and 108c, 108c' may connect at their rearward end regions to respective support plates 109a, 109b, 109c. Support plates 109a, 109b, 109c upper and lower support/connecting members 108a, 108a'; 108b, 108b'; and 108c, 108c' may also be made from suitably strong and durable materials such as for example a suitable type/grade of steel such as mild carbon steel. With particular reference to FIGS. 3C, 3E and 3K, upper and lower pairs of support/connecting members 108a, 108'; 108b, 108b'; and 108c, 108c' may each consist of a generally flat transversely and longitudinally extending upper plate portion 205 with opposed spaced, downwardly depending longitudinally extending flanges 207. Upper pin pivot connections 198' and lower pin pivot connections 198 may be provided to allow for support and pivoting movement of support plates 109a, 109b, 109c, by and relative to, the respective upper and lower pairs of support/connecting members 108a, 108a'; 108b, 108b'; and 108c, 108c'.

With particular reference to FIG. 3K, which illustrates a representative example of pin pivot connection 198 at the rearward end region of member 108a, bushings 199 may be provided at either end of a hollow tube device/member 200 fixedly mounted such as by welding in a transverse orientation at the end of member 108a below plate portion 205 and between depending flanges 207. Pivot pin 201 is shown in greater detail in FIG. 3M and may include a shaft 202 with a fixedly attached cam shaped (teardrop or pear shaped) end plate 210 fixedly connected to shaft 202 by a method such as welding. The narrower end region of end plate 210 may include a slot 203 for receive a bolt for securing end plate 210 and thus also securing pivot pin 201 to support plate 109a. The bolting of end plate 201a to support plate 109a prevents pivot pin 201 from moving out of alignment/position and prevents pivot pin 201 from rotating relative to support plate 109a. Pivot pin 201 may be made from a suitably strong and durable material such as chrome steel. Bushings 199 may be made from a polymer such as by way of example only Iglide® L280 manufactured by Igus® GmbH.

Referring to FIG. 3K, pivot pin 201 may extend through opposed openings 204 in downwardly depending sidewalls 209, 209' of support plate 209 and through the center of the tube device 200 within bushings 199. Slots 203 of end plate 210 align with openings 206 in downwardly depending sidewall 209' and are secured with a bolt and nut (FIG. 3E). Thus, pin 201 is held in position within bushings 199 between sidewalls 209, 209' of support plate 109a, preventing rotation of pin 201 and enabling bushings 199 to pivot about pin 201. Thus, the rearward end region of upper and lower pairs of support members 108a, 108a'; 108b, 108b'; and 108c, 108c' may be able to pivot relative to their respective support plates 109a, 109b, 109c.

The forward end regions of these upper and lower pairs of support members 108a, 108a'; 108b, 108b'; and 108c, 108c' are connected via another pivotable linkage to respective to support plates 105a, 105b, 105c by respective harrow mounting plate assemblies 104a, 104b, 104c. Support plates 105a, 105b, 105c may be connected to rearward support members 528 of frame support 518 of chisel plow 101 (FIG. 1) in a manner such as for example will be described hereinafter. Outwardly positioned harrow mounting plate assemblies 104a and 104c may be constructed in the same manner as each other. Medially positioned harrow mounting plate assembly 104b may be constructed in a somewhat different, but functionally similar manner, as harrow mounting plate assemblies 104a, 104c. Harrow mounting plate assembly 104b may however be configured such that they can be re-positioned in a transverse direction relative to the rearward support members of frame support 518 of chisel plow 101 to a suitable location. Flexibility in the positioning of at least some harrow mounting plate assemblies 104b on a particular tine harrow apparatus 102 may accommodate different tillage spacing arrangements, which may allow for greater flexibility in the positioning of a given tine harrow section on chisel plow 101. As a result, different spacings of tine harrow sections arrangements may be accommodated, depending on the desired application.

Figure 3B:
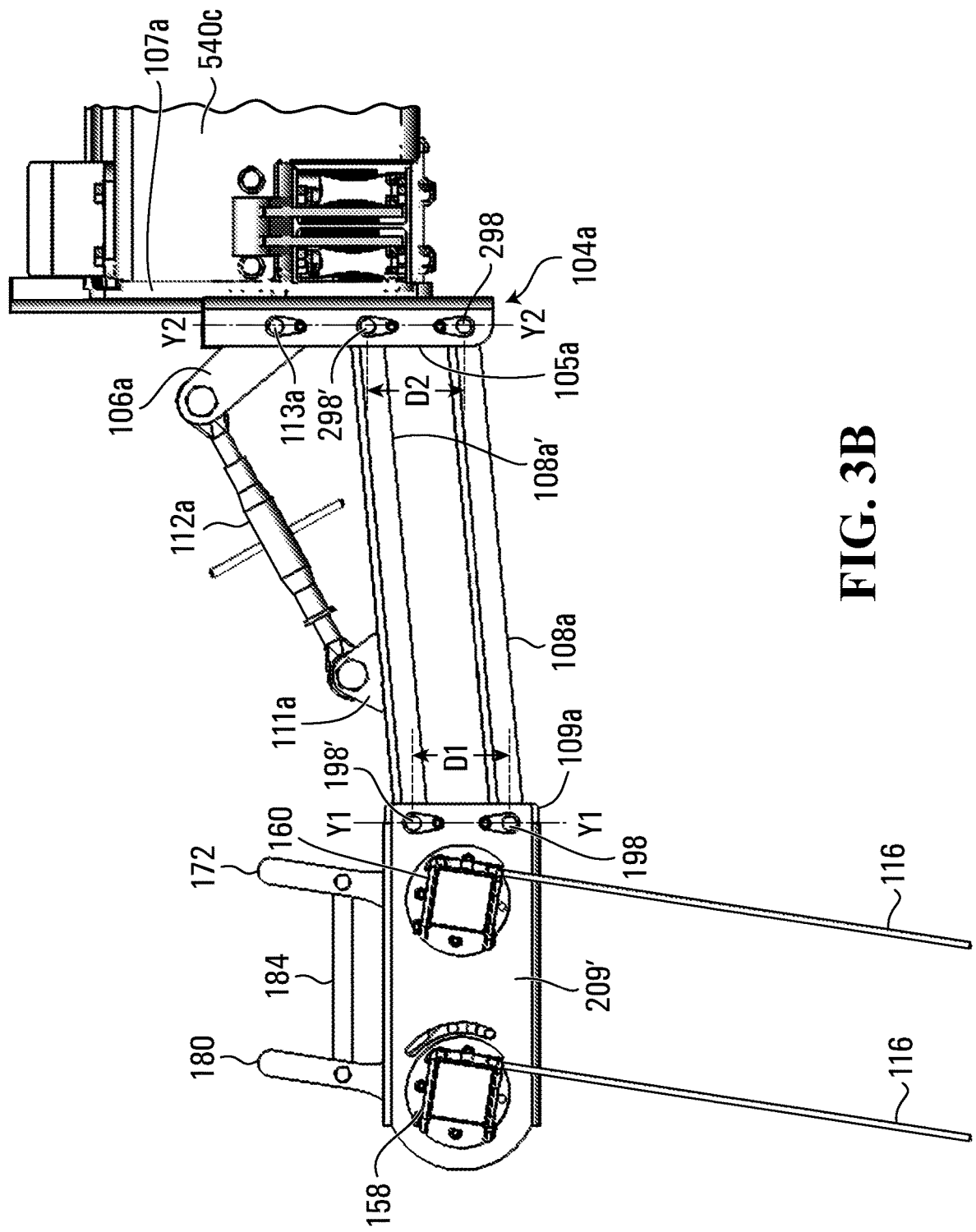
Figure 3D:
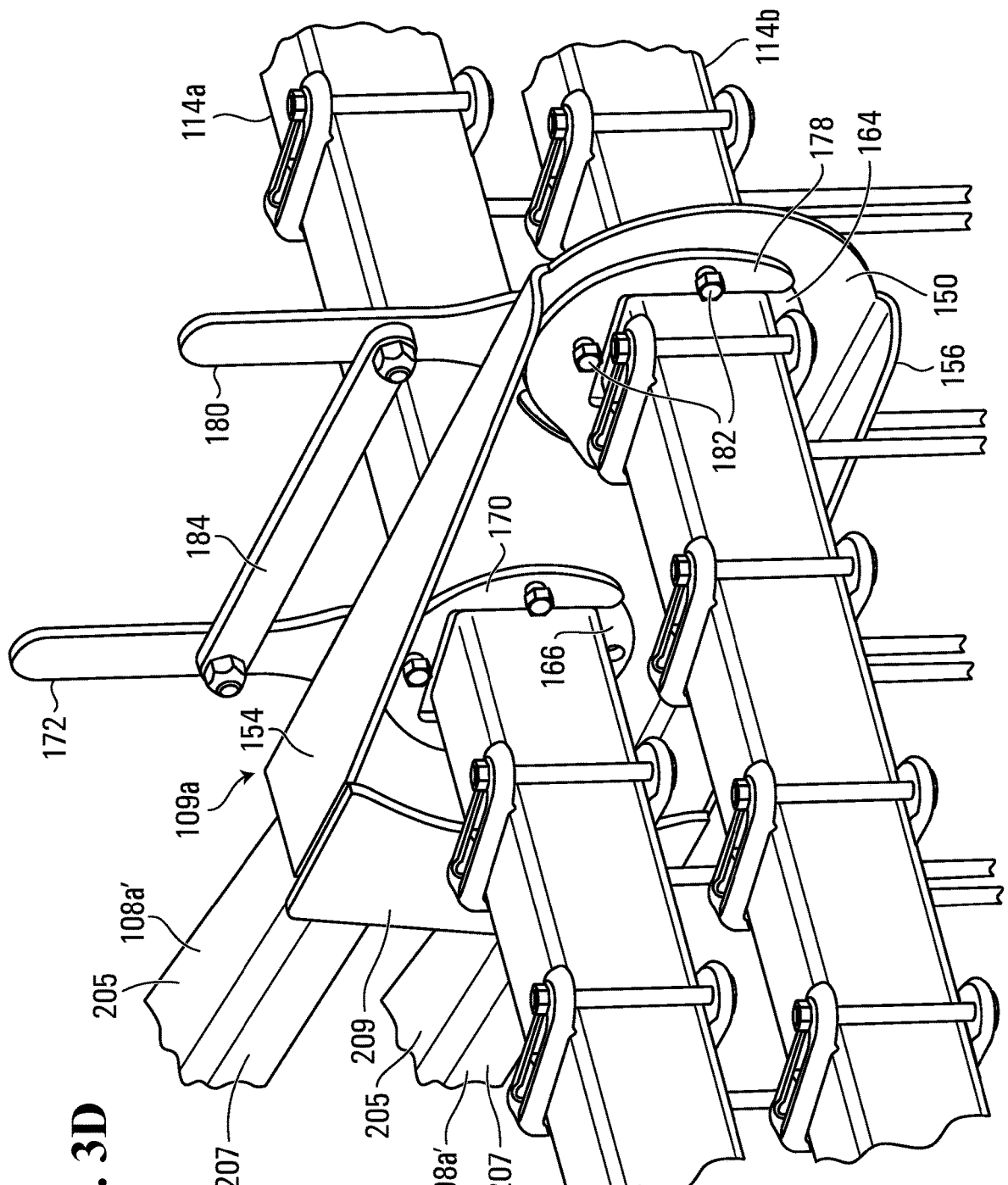
FIG. 3D is a rear left side perspective view of part of the harrow apparatus of FIG. 3A.
Figure 3F:
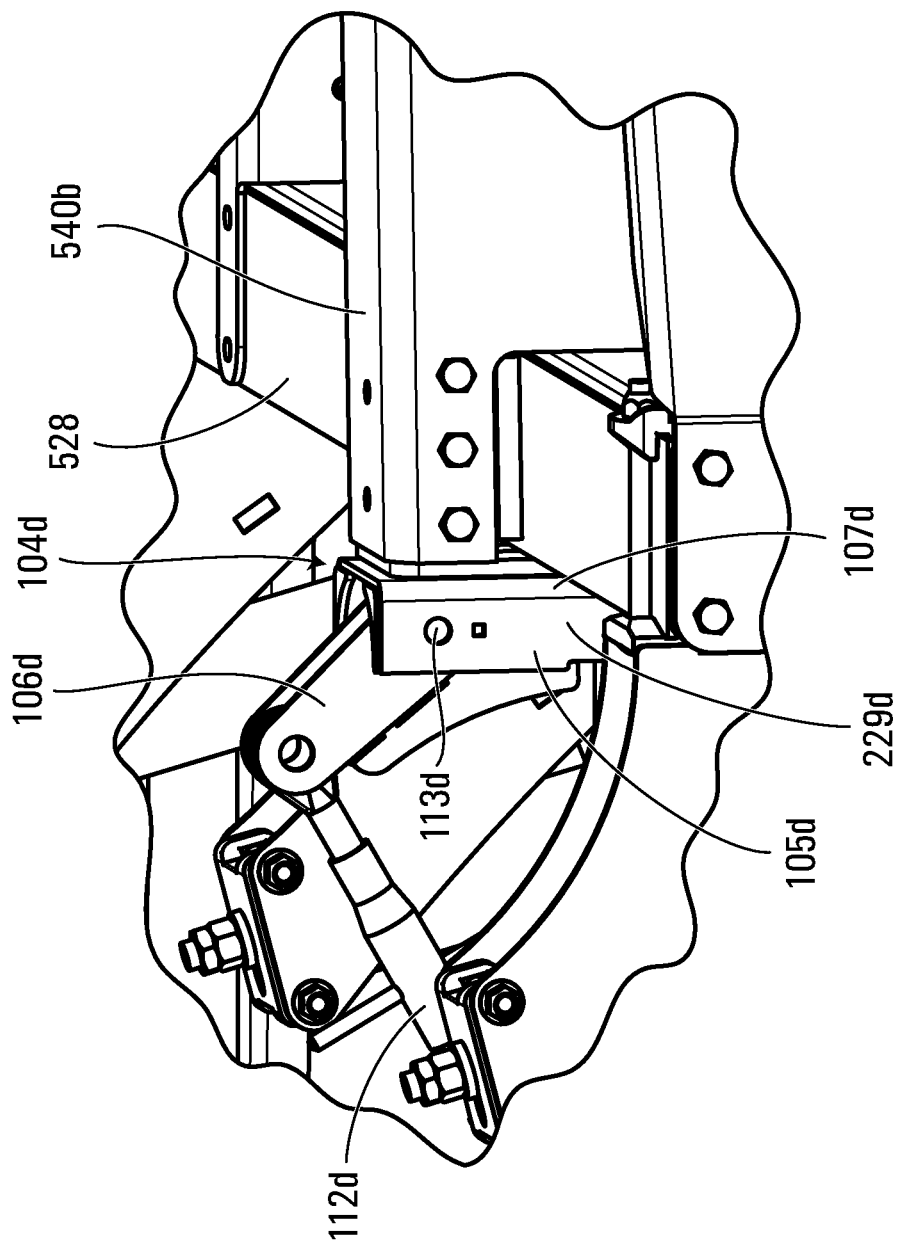
FIGS. 3F and 3G are enlarged perspective views of part the apparatus of FIG. 1.
Figure 3G:
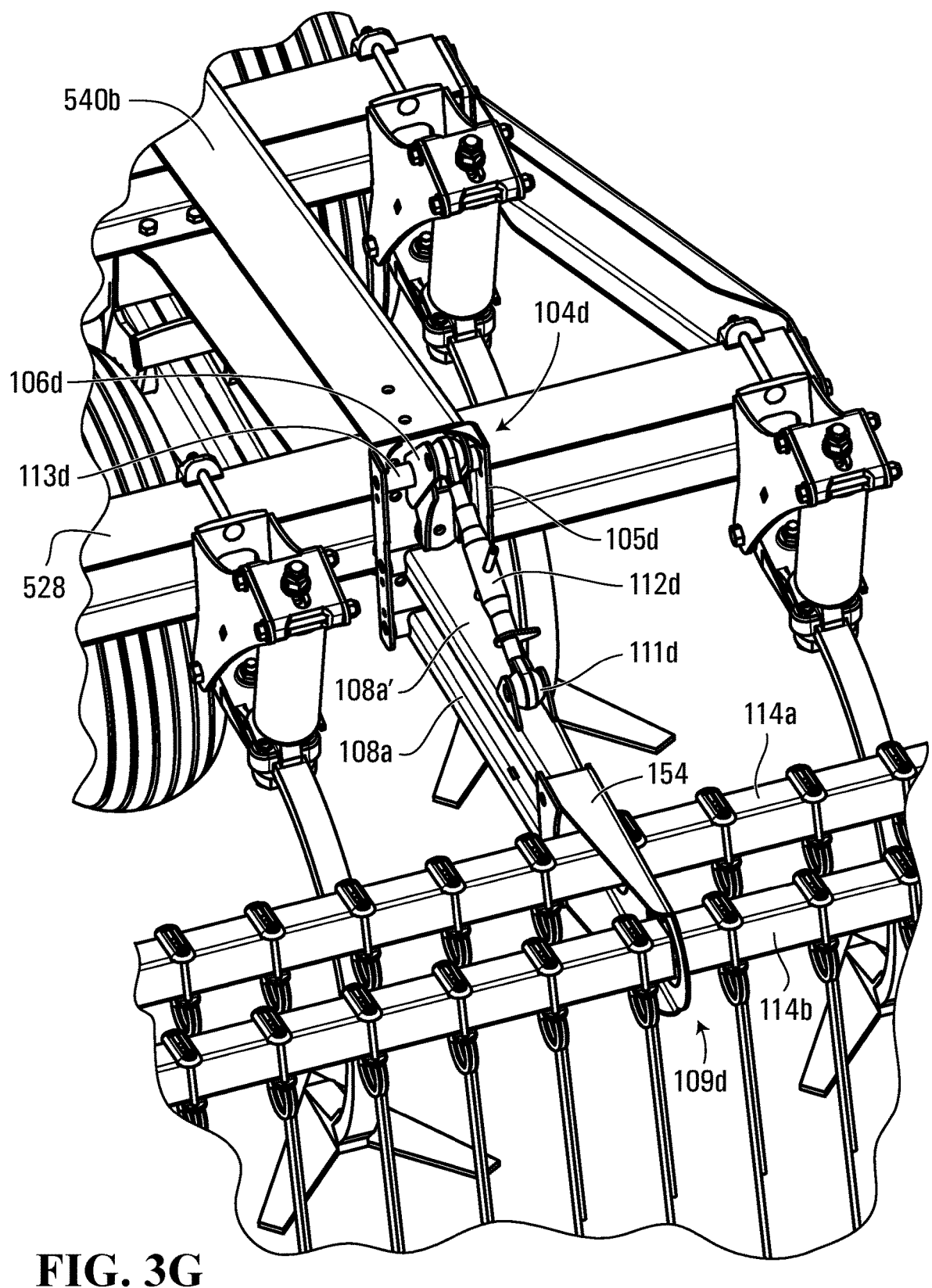
Figure 3H:
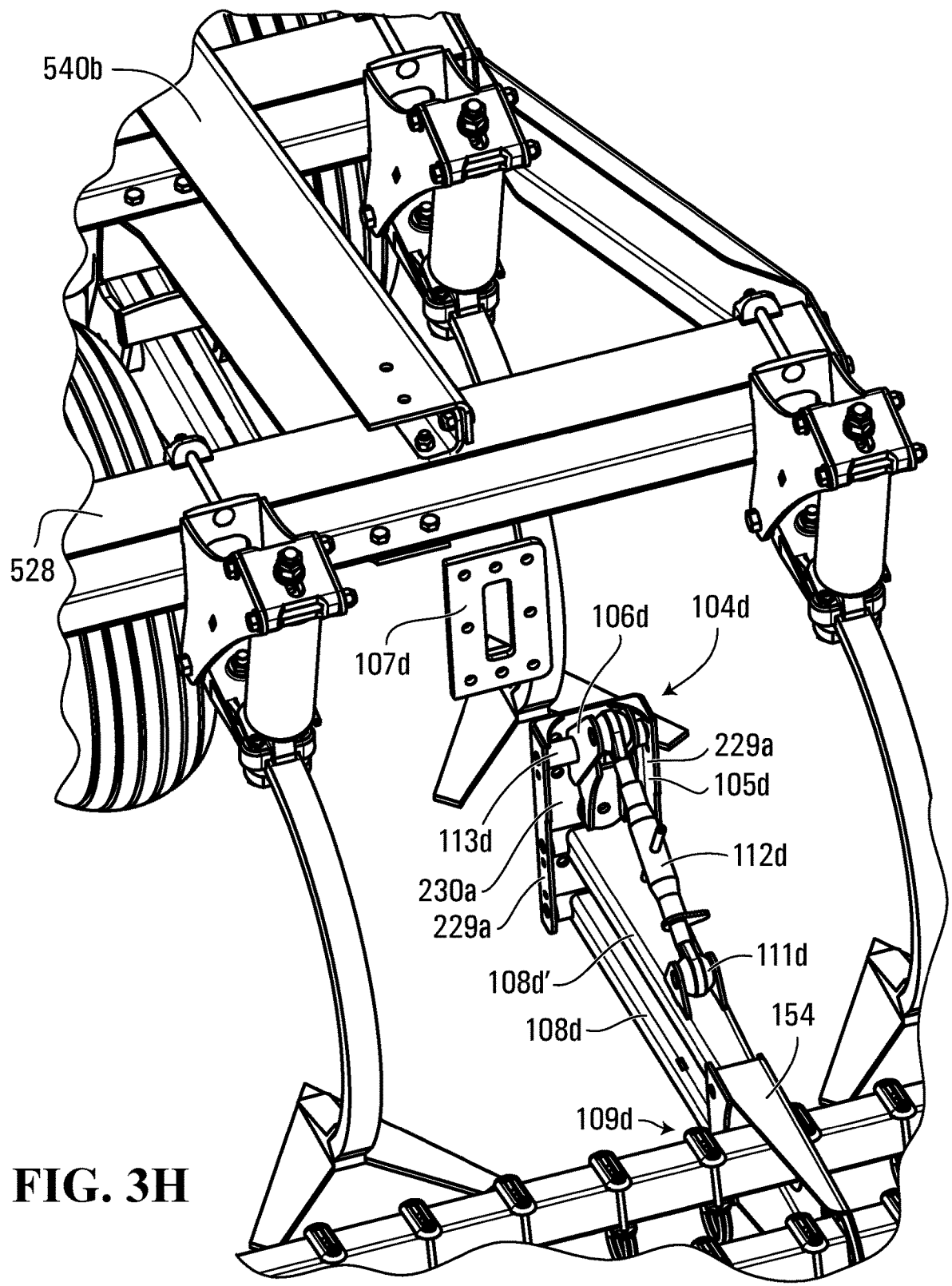
FIG. 3H is an enlarged rear perspective view of part of the apparatus of FIG. 3A with some parts thereof exploded.

As shown in FIGS. 3B and 3C, the center of rotation of pivot connection 198' is vertically spaced a distance D1 from the center of rotation of pivot connection 198. Similarly, as shown in FIG. 3B, the center of rotation of pivot connection 298' is vertically spaced a distance D2 from the center of rotation of pivot connection 298. Pivot connection 198' may be aligned with pivot connection 198 on a vertical axis Y1. Pivot connection 298' may be aligned with pivot connection 298 on a vertical axis Y2. Accordingly, when support plates 109a, 109b, 109c are moved vertically upward or downward relative to the ground surface such as for example as a result of a change in the level of the ground surface 516 relative to the main support frame 518 of the chisel plow 101, with the force of gravity acting on the tine harrow apparatus, the respective upper and lower pairs of support members 108a, 108a'; 108b, 108b'; and 108c, 108c' will be pivoted at their forward end regions about pins 201 relative to the support plates. During such vertical movement, the respective upper and lower pairs of support members 108a, 108a'; 108b, 108b'; and 108c, 108c' will also be pivoted at their forward end regions about the support plates 105a, 105b, 105c. Accordingly, the aforementioned structure respective upper and lower pairs of support members 108a, 108a'; 108b, 108b'; and 108c, 108c' provides a plurality of transversely spaced pairs of support members in a parallel linked arrangement. The result is that if the vertical height setting of the tines relative to the ground level (and/or relative to frame support 518 of chisel plow 101) is adjusted, the support plates 109a, 109b, 109c will be maintained at the same angle relative to the ground surface level 516/frame support 518 and thus the tine support structures 114a, 114b, and the tines attached thereto, will also be maintained at the same angle relative to each other and to the ground surface level 516/frame support 518 during vertical upwards and downwards movement of the tine support structures 114a, 114b.

With particular reference to FIGS. 3A, 3B and 3K as noted above, upper and lower support members 108a, 108a'; 108b, 108b'; and 108c, 108c' may each consist of an upper, generally flat transversely and longitudinally extending plate 205 with opposed spaced, downwardly depending, longitudinally extending flanges 207. An upper pin pivot connection 298' and a lower pin pivot connection 298 may be provided to allow for pivoting movement of respective upper and lower pairs of support members 108a, 108a'; 108b, 108b'; and 108c, 108c' relative to support plates 105a, 105b, 105c. Pin pivot connections 298 and 298' may be constructed like pin pivot connection 198 described above including bushings 199 inside a tube device 200 fixedly mounted in a transverse orientation at the forward end region of respective support members 108a, 108a'; 108b, 108b'; and 108c, 108c', between depending flanges 207 of plate 205. Also, as described above, a pivot pin may extend through the center of the tube device 200 within the bushings 199 and able to rotate in relation to bushings.

A representative harrow mounting plate assembly 104d is shown in greater detail in 3F-H. Support plate 105d is mounted to open channel structural member 540b and may be constructed the same as harrow mounting plate assemblies 104a and 104c. Harrow mounting plate assembly 104d may include a support bracket 105d, pivot linkage 106d and mounting plate 107d. Support bracket 105d may have vertical flanges 229d projecting rearwards from a vertically and transversely extending plate member 230d, and be operable for locating the forward end regions of support members 108d, 108d' therebetween via a pivotable linkage. Opposed cam shaped end plates 210 may be mounted to exterior surfaces of the vertical side vertical flanges 229d of support bracket 105d, at opposite openings therethrough and may thus function to hold the pin of a pivotable linkage like those described above in position within a bushing.

A turnbuckle mechanism 112d can be provided that is operable to adjust and fix/set the angle of support members 108d, 108d' relative to support bracket 105d thus allowing the angle of the support members 108d, 108d' relative to the ground surface to be adjusted. Turnbuckle 112a attaches at its rear end to a bracket 111d on the upper surface of the upper support member 108d' and at its front end to mounting plate 105d via pivot linkage 106d. Pivot linkage 106a may be secured to support plate 105a by pin mechanism 113d and this pivot connection may be constructed in a manner similar to pin pivot connections 198, 198' and 298, 298' as described above.

The front facing side vertical and transversely extending surface of support bracket 105d may be secured to a rectangular mounting plate 107d by four bolts (not shown) located through two pairs of aligned holes, each pair positioned at respective top and bottom edges of support bracket 105d and mounting plate 107d. Mounting plate 107d may be affixed to longitudinally orientated open channel structural member 540b and rearward facing side edges of upper lower flanges of transversely oriented open members 528 by suitable means such as welding. Mounting plate 107d (and the corresponding mounting plates of harrow mounting plate assemblies 104a, 104c) are a type of mounting plate that may be pre-existing upon a frame support 518 of a chisel plow 101 and for example may be welded in position. Thus, the transverse position of mounting plate 107d on frame 518 may be fixed (ie not adjustable in a transverse direction) and there may be a limited number of such plates 107d on a particular frame support 518 upon which it is desired to mount tine harrow apparatus 102.

Harrow mounting plate assembly 104a may be affixed to longitudinally orientated open channel structural members 540c/528 in a similar manner as harrow mounting plate assembly 104d is attached to members 540b/528, as described above, via a mounting plate 107a (FIG. 3B) which may be arranged like mounting plate 107d. Turnbuckle 112a attaches at the rear end to bracket 111a on the upper surface of the top support member and at the front end to mounting plate 105a via linkage 106a. Pivot linkage 106a may be secured to support plate 105a by a pin pivot connection that may include a pin pivot connection 113a, which may be like pin connection 113d.

Similarly, harrow mounting plate assembly 104c may be affixed to longitudinally orientated open channel structural members 540d/528 in a similar manner as harrow mounting plate assembly 104d is attached to members 540b/528, as described above, via a mounting plate 107c (FIG. 3B) which may be arranged like mounting plate 107d. Turnbuckle 112c attaches at the rear end to bracket 111c on the upper surface of the top support member and at the front end to mounting plate 105c via linkage 106c. Pivot linkage 106c may be secured to support plate 105c by a pin pivot connection that may include a pin connection 113c, which may be like pin connection 113d.

Figure 3I:
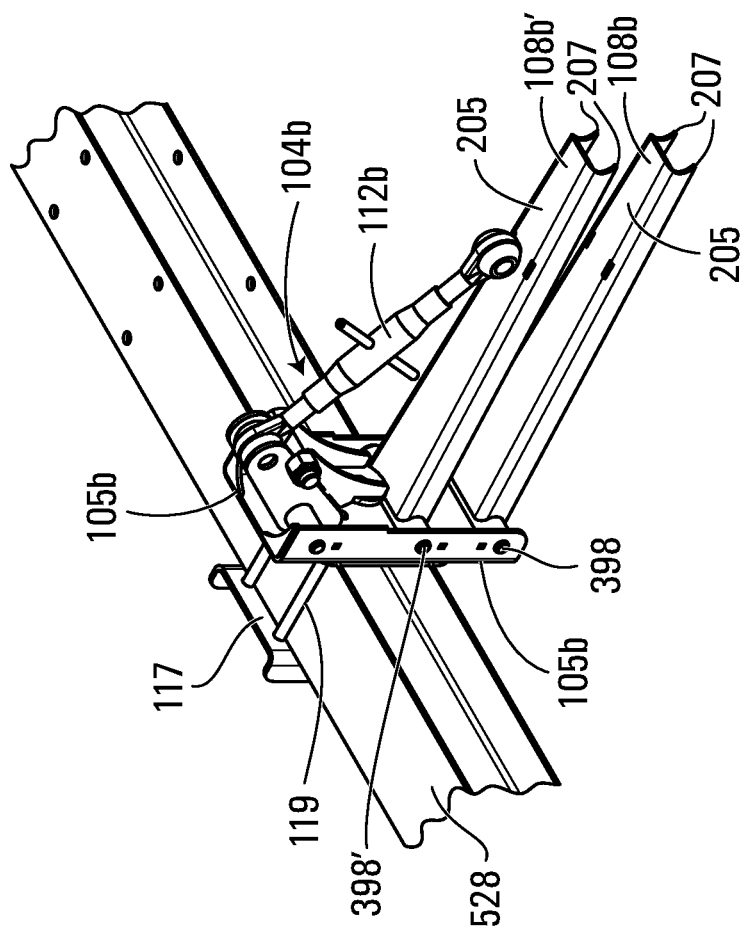
FIG. 3I is an enlarged perspective view of part of the apparatus of FIG. 3A.
Figure 3J:
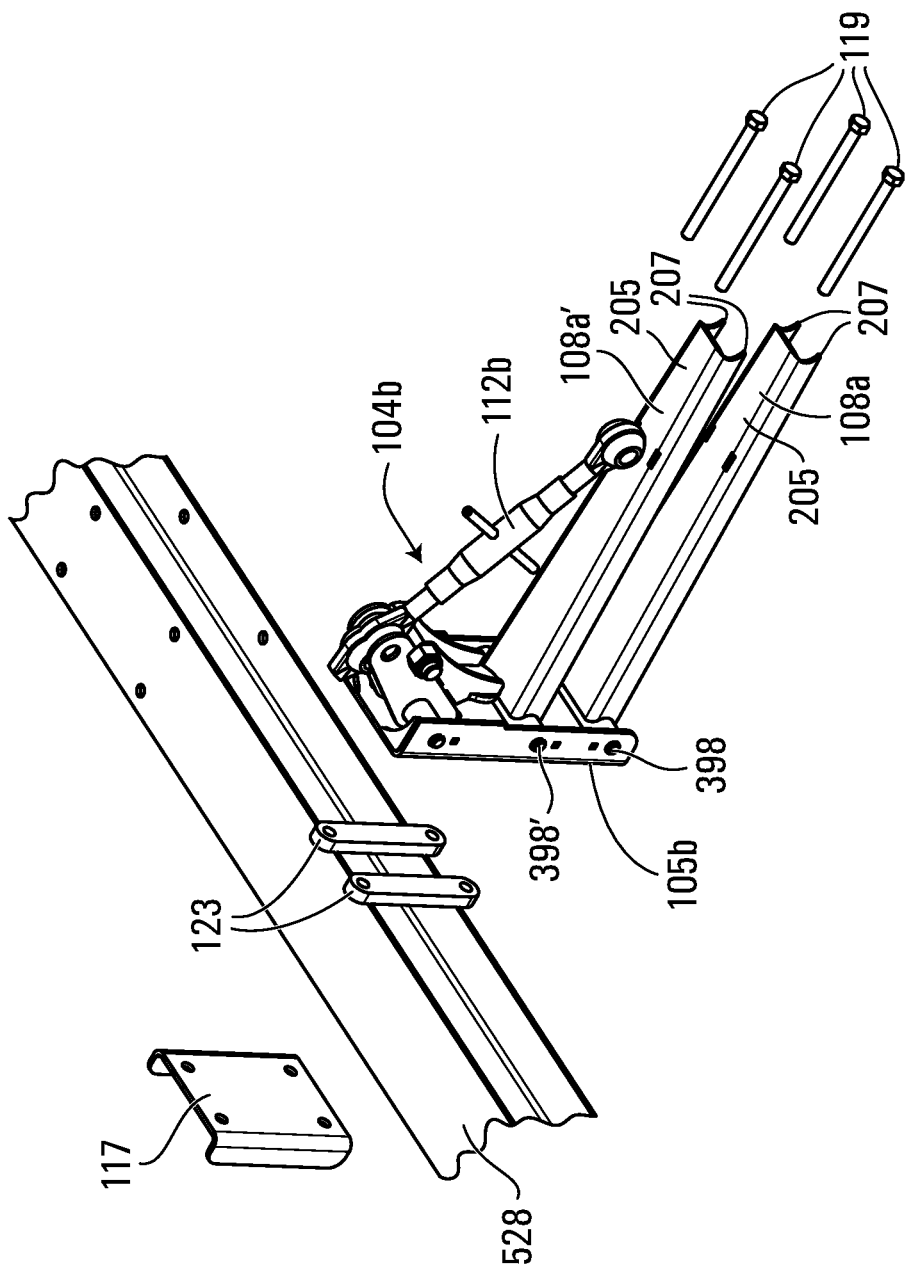
FIG. 3J is an is an enlarged perspective view of part of the apparatus of FIG. 3A with some parts thereof exploded.
Figure 3K:
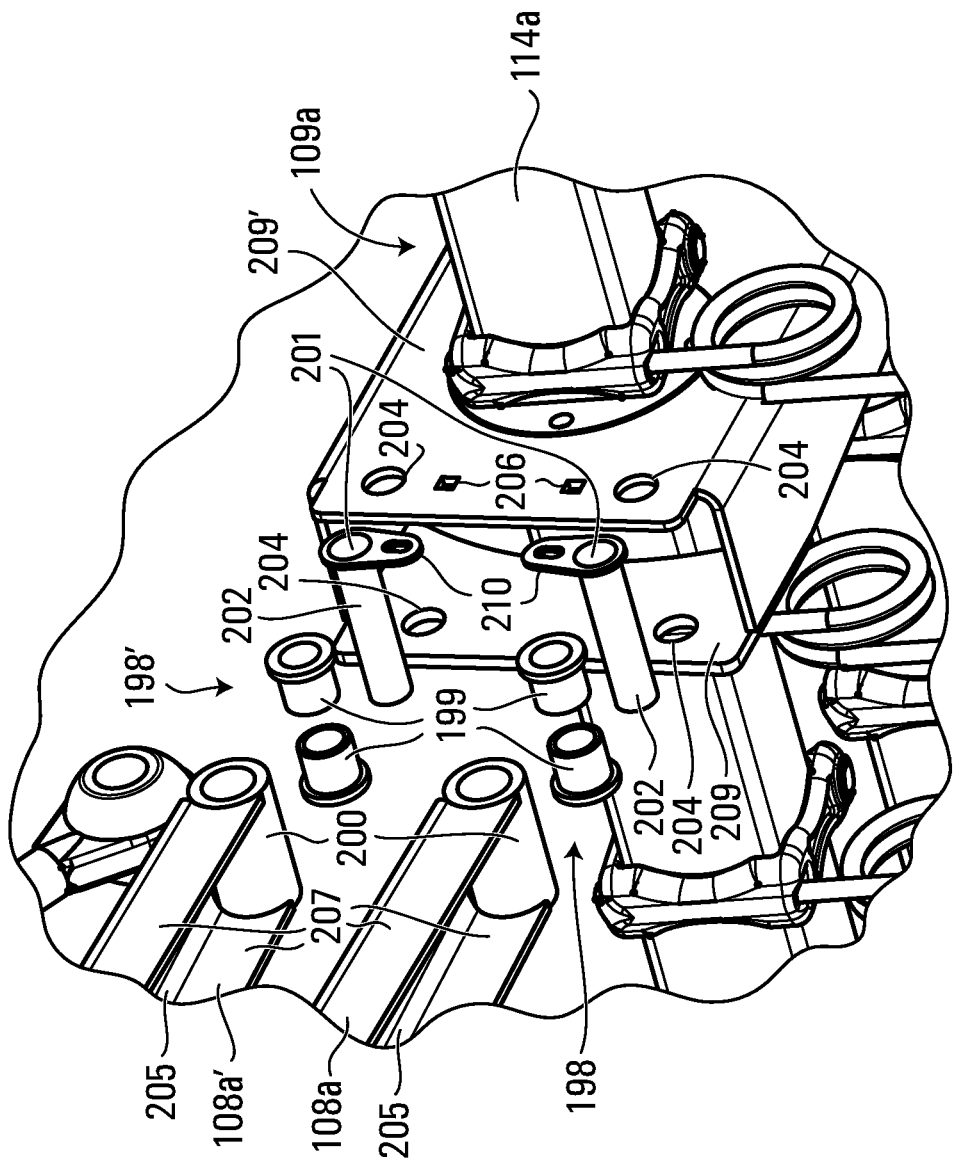
FIG. 3K is an enlarged perspective view of part of the apparatus of FIG. 3A with some parts thereof exploded away.

Harrow mounting plate assembly 104b is shown in greater detail in FIGS. 3I and 3J, and includes a support bracket 105b, a pair of vertically oriented, transversely spaced, mounting blocks 123, a front vertically and a transversely extending support plate 117 and a plurality of nuts/bolts 119. A turnbuckle mechanism 112b, that may be constructed like turnbuckle mechanisms 112a, 112c, may optionally be provided between support bracket 105b and upper support member 108b' (not shown in FIG. 3A). Upper and lower support members 108a, 108a' may also be connected to support bracket 105b via pivotable linkage in a similar manner to as described above, using pin pivot connections 398, 398' like pin pivot connections 198, 198' and 298, 298'. Front support plate 117 may be rectangular in shape, with vertical flanges projecting frontwards in order to provide additional strength. Support bracket 105b, mounting blocks 123 and front support plate 117 may include two pairs of axially aligned openings at the top and bottom for receiving four bolts 119 therethrough. When installed, front support plate 117 and mounting blocks 123 sandwich the respective front and rear faces of a section of transversely oriented open channel structural support member 528, whilst bolts 119 sandwich the top and bottom faces. Through this arrangement, harrow mounting plate assembly 104b may also be securely held in place on transverse member 528. Harrow mounting plate assemblies 104b may be positioned at many different transverse locations along transverse member 528, which may allow for greater flexibility in the positioning of a given tine harrow section on chisel plow 101. As a result, different spacings of tine harrow sections arrangements may be accommodated, depending on the desired application.

The above described arrangement may provide pivoting together of connecting lower support members 108a, 108b and 108c about a common first transverse axis and corresponding pivoting together of upper support members 108a', 108b' and 108c' about a common second transverse axis, where the first and second axes are parallel to, and vertically spaced from, each other. The angle of connecting lower support members 108a-c and the angle of connecting upper support members 108a-c' relative to the ground 516 can be controlled through adjustment of turnbuckles 112a and 112c that extend between respective pivot linkages 106a, 106c and support members 108a', 108c'. By lengthening turnbuckles 112a and 112c tine support structures 114 will move downwards, closer to field/ground surface 516. However, during such movement, the pivoting action is such that support plates 109a-c do not change their angle relative to the field/ground surface 516, regardless of their distance from field/ground surface 516.

With reference to FIGS. 3B-E and 3L, stationary support plate 109a is shown in greater detail. Support plate 109a extends longitudinally rearward from end regions of upper and lower support members 108a, 108a' and comprises an outer vertical face 150, an inner vertical face 152, an upper flange 154 and a lower flange 156. Extending through the vertical face of support plate 109a are generally circular front and rear support member openings 158 and 160 respectively which as will be explained below, function to provide openings to locate support structures 114a and 114b and allow the angle of tines 116 relative to the field surface 516 to be adjusted.

Fixedly attached to support structures 114a, 114b by a suitable method such as welding, are respective front and rear pivot disk plates 162 and 164 (FIG. 3C). Pivot disk plates 162, 164 are generally circular disc plates of a similar thickness of material as support plate 109a. Pivot disk plates 162, 164 each have an outer circumference edge surface that is suitably sized to fit within respective front and rear support member openings 158 and 160 of the support plate 109a (FIG. 3L), and function to locate support structures 114a, 114b and provide rotational bearing surfaces within support plate 109a.

Figure 3L:
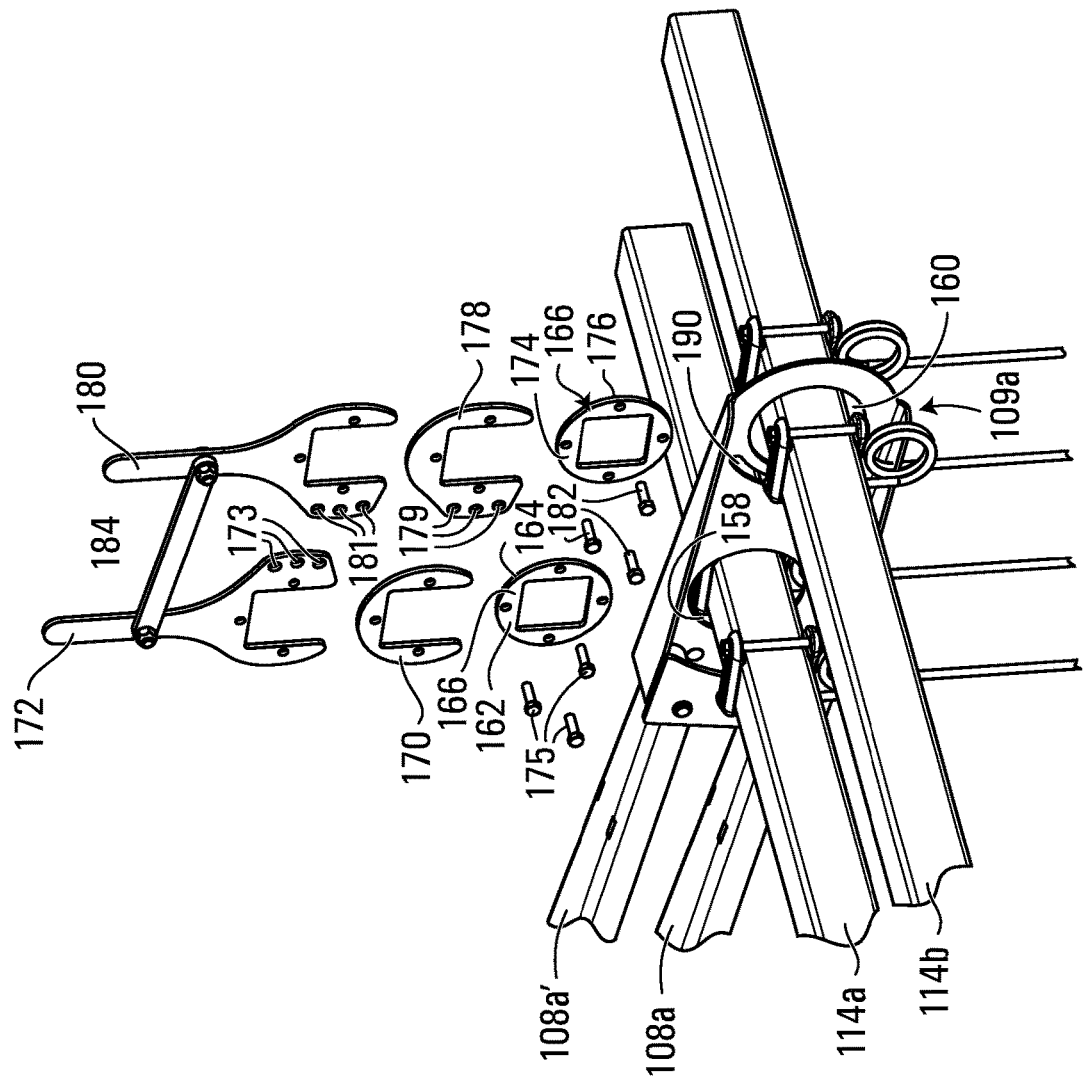
FIG. 3L is a perspective view of another portion of the apparatus of FIG. 3A with some parts thereof exploded away.
Figure 3M:
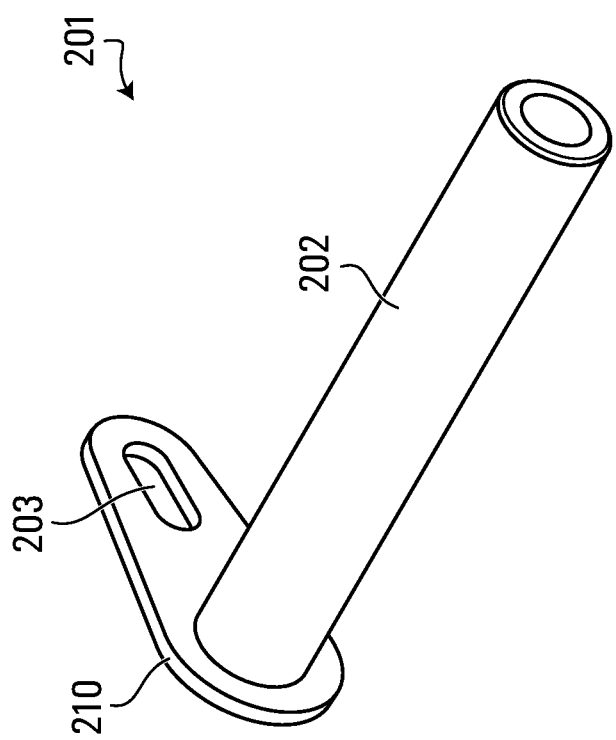
FIG. 3M is a perspective view of an example pin for use in the apparatus of FIG. 3A.
Figure 5A:
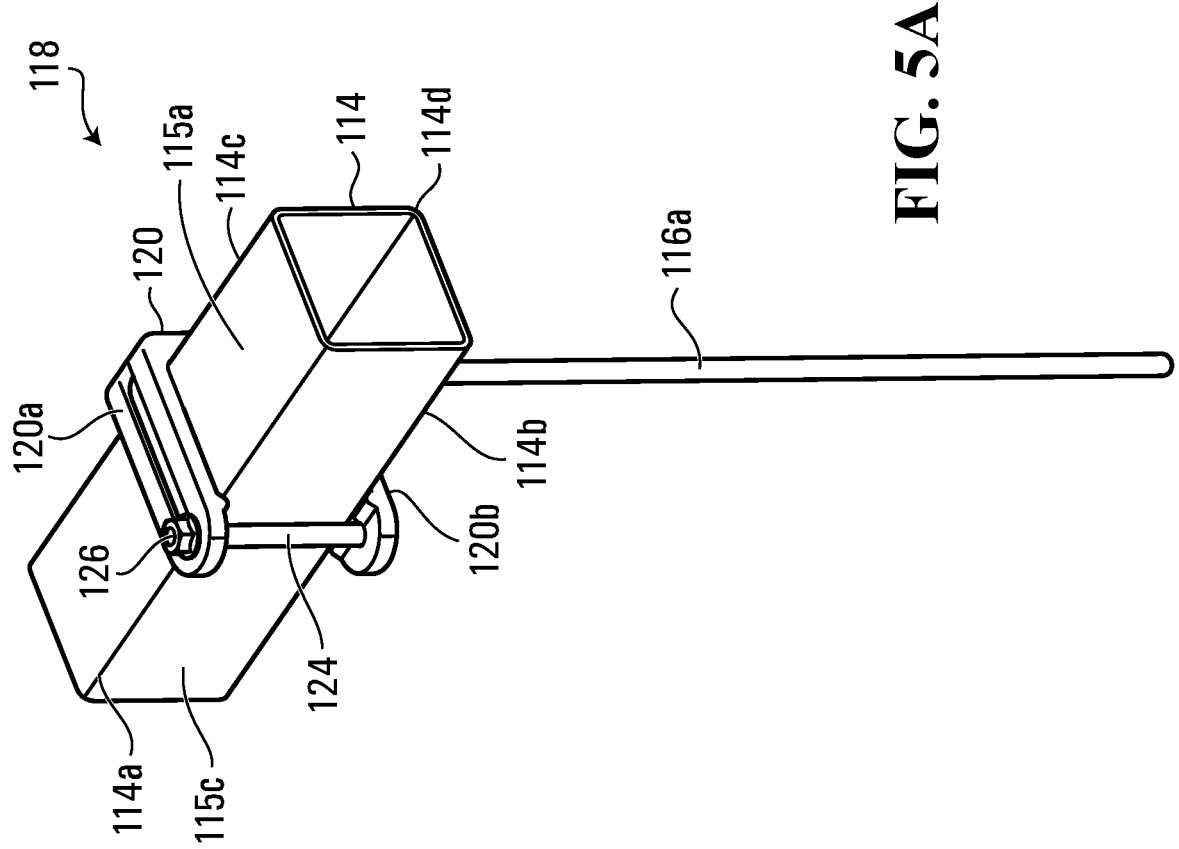
Figure 5B:
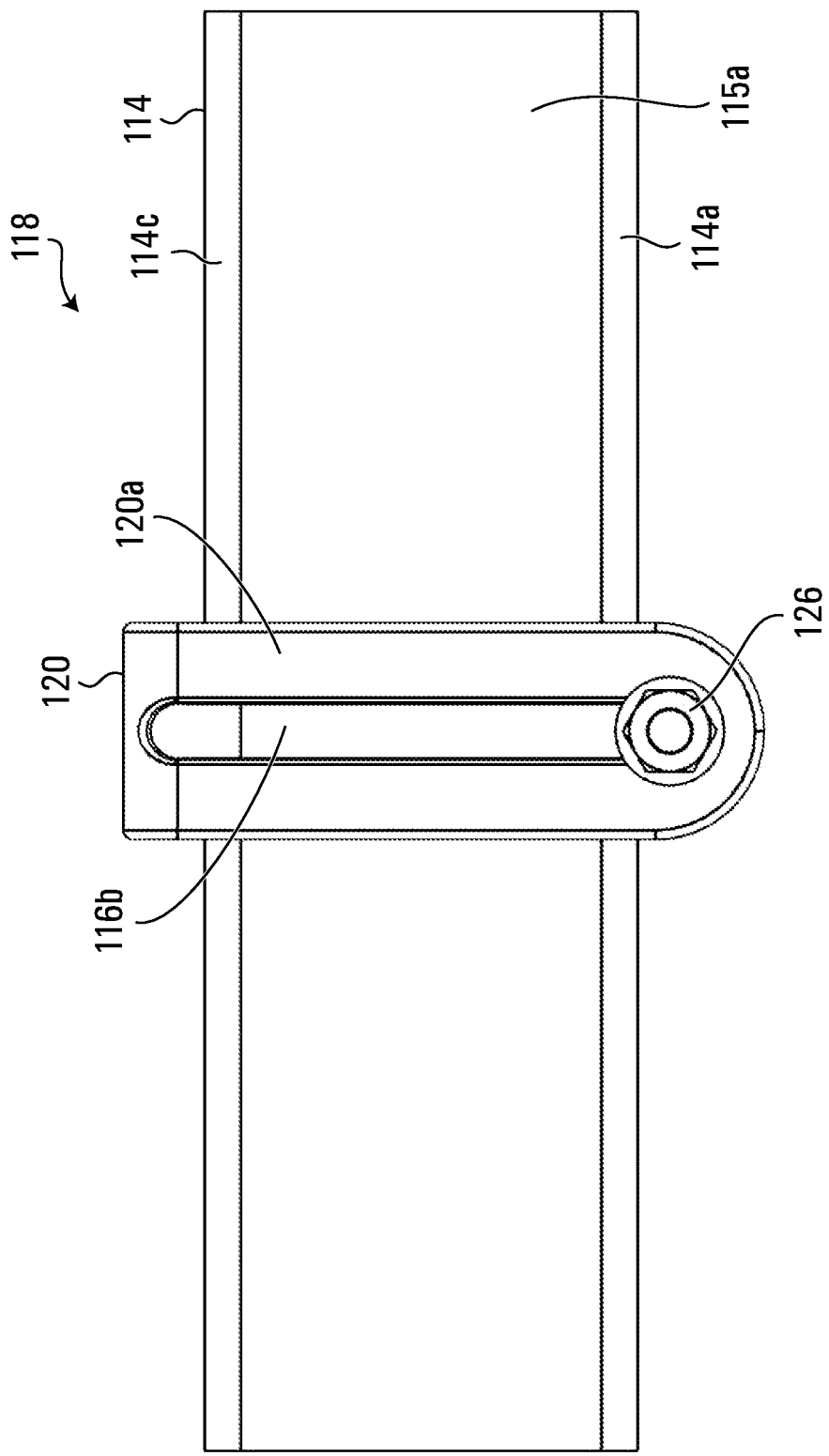
Figure 5C:
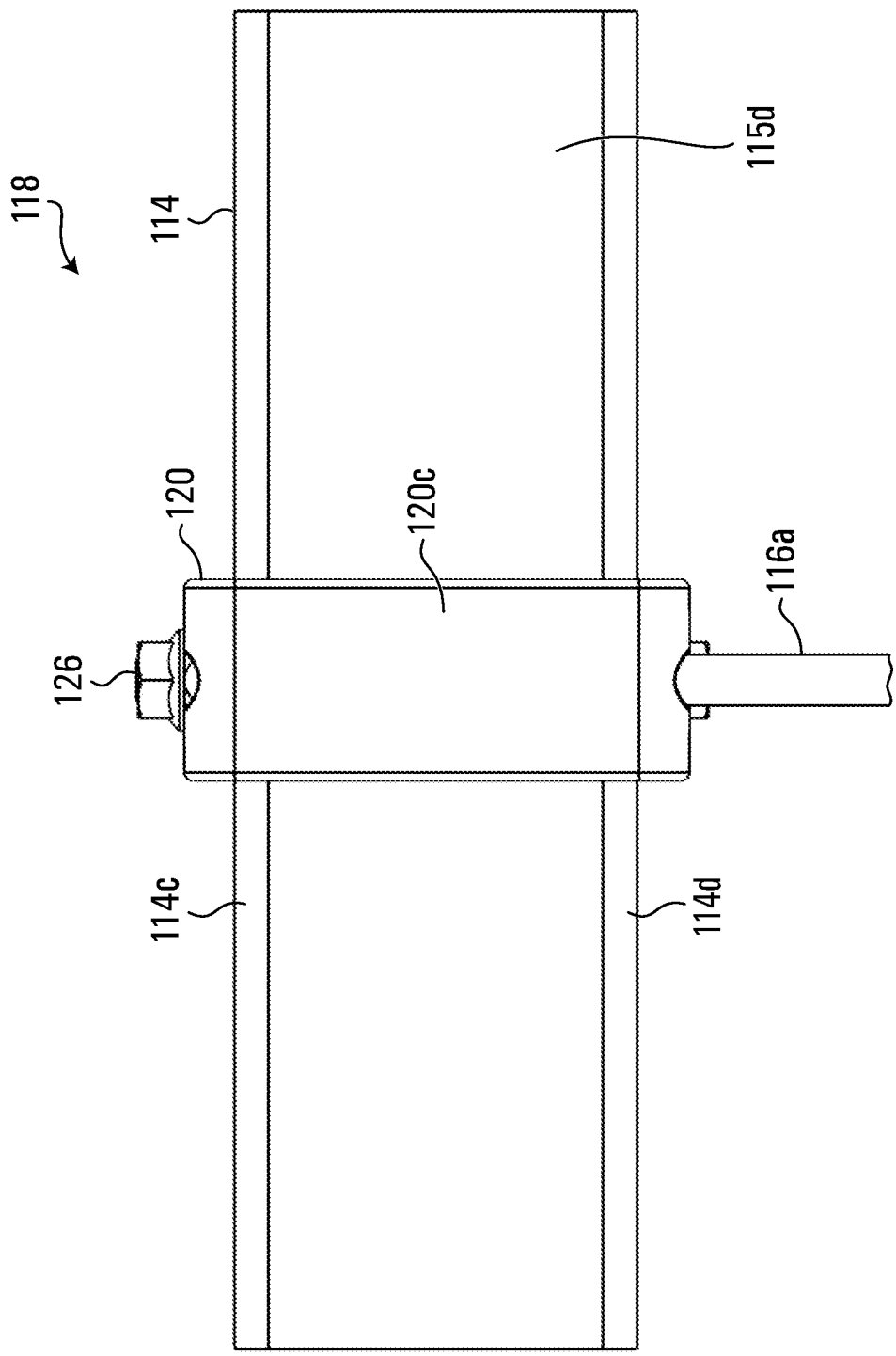
Figure 5D:
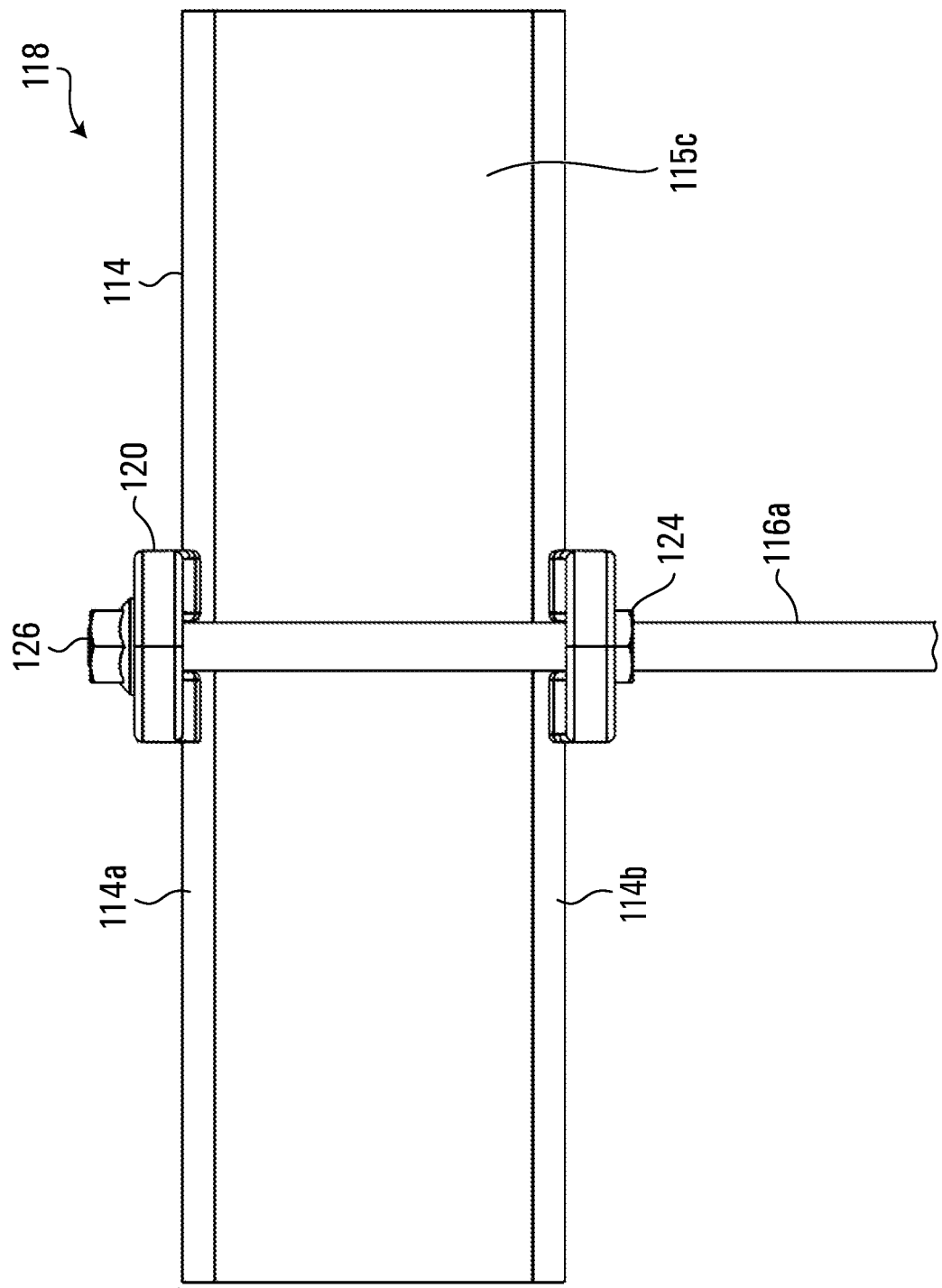

With reference to FIG. 3L in particular, front pivot disk plate 162 comprises an outer facing surface 166 and an inner facing surface 168 and is sandwiched on outer surface 166 by a front crescent plate 170 and on inner surface 168 by a front index plate 172, which are retained together using bolts 175. Front crescent plate 170 may have a partially circular outer circumference with a partially square inner opening sized to accommodate support structure 114a. Front index plate 172 may be generally teardrop shaped, with an elongated upper portion and a lower portion open at the lower end to a partially square opening sized to accommodate support structure 114a. Front index plate 172 may also include three spaced apart holes 173 positioned at the rear end of the lower portion. The outer circumference of pivot disk plate 162 is sized to fit securely, whilst still being able rotate within front support member opening 158 of support plate 109a. Through the cooperation described above, rotational movement of front index plate 172 (such as by a person applying an appropriate force to the same) in the directions indicated by arrow 186 in FIG. 3C will result in equivalent rotational movement of pivot disk plate 162, support structure 114a and attached tines 116.

Similarly, rear pivot disk plate 164 comprises an outer facing surface 174 and an inner facing surface 176 and is sandwiched on outer surface 174 by rear crescent plate 178 and on inner surface 176 by rear index plate 180, which are retained together using bolts 182. Rear crescent plate 178 may have a partially circular outer circumference with a partially square inner opening sized to accommodate support structure 114a. Three spaced apart holes 179 may be located at the front end, following/aligned with the circumference of an arcuate slot 190 in support plate 109a. Rear index plate 180 may be substantially similar to front index plate 172 but is installed in a different orientation such that holes 181 are orientated towards the front end of tine harrow section 102c, aligned with holes 179 and slot 190. Holes 179, 181 and slot 190 are configured to receive a pin 192 therethrough, which functions to fix the position of rear index plate 180 relative to support plate 109a.

Front and rear index plates 172, 180 may have elongated upper members connected by a pivotable linkage 184, meaning any rotational movement (arrow 186 in FIG. 3C) of front index plate 172 is translated to rear index plate 180 through linkage 184 and vice versa.

Stationary support plates 109b and 109c may also have a similar arrangement as described above comprising pivot disks to secure and locate support structure 114 and form rotation adjustment mechanisms operable to adjust the rotational angle of support structures 114a, 114b. In a similar manner, each tine harrow section 102a, 102b, 102c, 102d, and 102e may include a plurality of corresponding stationary support plates and pivot disks securing and locating support structure 114. Through the cooperation described above, the relative position of all index plates are linked to the position of all tines 116, through their respective pivot plates and support structures 114a, 114b. Each tine harrow section 102a, 102b, 102c, 102d, and 102e may include one stationary support plate having the crescent plate and index plate arrangement described above to allow an operator to adjust the angle of tines 116 for an individual harrow section. When it is desirable to adjust the angle of tines 116 relative to ground 516 an operator may remove the pins from all rear index plates, allowing simultaneous and equal rotation of all index plates and therefore all tines 116 on tine harrow apparatus 102. Once tines 116 are at the desired angle relative to ground surface 516 the pins can be replaced to lock tines 116 in position.

The stationary support plates, pivot disks with crescent plates and index plates may all also be made from suitably strong and durable materials such as a suitable type/grade of steel, for example mild steel.

When tillage apparatus 100 is pulled behind a propulsion unit 512, both ground engagers 600 of chisel plow 101 and tines 116 of tine harrow apparatus 102 may be operable to treat agricultural land by penetration of the soil, levelling protrusions such as rodent hills, spreading debris and distributing debris into the soil.

Each of tines 116 may be made from any suitably strong material such as for example a suitable spring steel and having, for example, an overall length of about 48" and a diameter of about ⅝". The wire section may be formed into a tine having: (i) a generally L-shape with a main leg/body portion 116a having a length LT1, that may be in the range of about 24 to 48 inches (such as for example 44") and which includes an upper region (which may be about 2 to 4 inches) and (ii) an angled top end portion 116b having a length LT2 that may be in the range of about 2 to 4 inches, for example 3⅞", as illustrated in FIGS. 4A and 4B. Tines 116 may be generally circular and solid in cross section but may also be any other suitable shape/configuration such as for example oval and may possibly be made in a hollow tubular sectional configuration. Main leg portion 116a of tine 116 may be generally straight, but may also have a different profile, such as having a lower portion that is curved in a forwardly directed direction or having a lower a second bend. The upper region of leg portion 116a and top end portion 116b may be disposed at an interior angle beta to each other that may be in the range of about 85 to 100 degrees, preferably between 85 and 95 degrees, and preferably is 90 degrees. Support structure member 114 may have four side surfaces 115a, 115b, 115c, and 115d (FIG. 4B) which provide a support structure that may be square or rectangular in cross section. In some embodiments, support structure 114 might have a cross section of another shape such as a C-shape or any shape that includes a partially square cross section suitable to be accommodated by clamping assembly 118. A cross-sectional shape that has three sides approximately at right angles to each other (eg. two side portions that are parallel to each other with an intermediate connecting side portion at right angles to both of the first two side portions, may be used for support structure members 114.

In order for the angled top end portion 116b to be held tightly/clamped against upward facing surface 115a of support structure 114, a downward directed force $CF_Y$ must be applied on the upper side of angled top end portion 116b of tine 116. Similarly, in order for the upper region upper region of main leg portion 116a to be held tightly/clamped against inward facing surface 115d of support structure 114, an outwardly directed force $CF_X$ must be applied on the outer side of the upper region upper region of main leg portion 116a. Additionally, for the angled top end portion 116b and the upper region upper region of main leg portion 116a to be held stably in position, transverse directed forces in direction Z must be exerted on opposed transverse sides of those portions 116a, 116b of tine 116.

Due to variations that may occur in the dimensions of commercially available tubing that may be used for support structure 114, in some circumstances tine 116 may not be held tightly/clamped tight against the surfaces 115a, 115d. However, clamping assembly 118 can still operate to sufficiently constrain tine 116 against the surfaces 115a, 115d as described above. As such, clamping assembly 118 still functions to secure tine 116 despite variations in the dimensions of support structure 114.

Figure 6A:
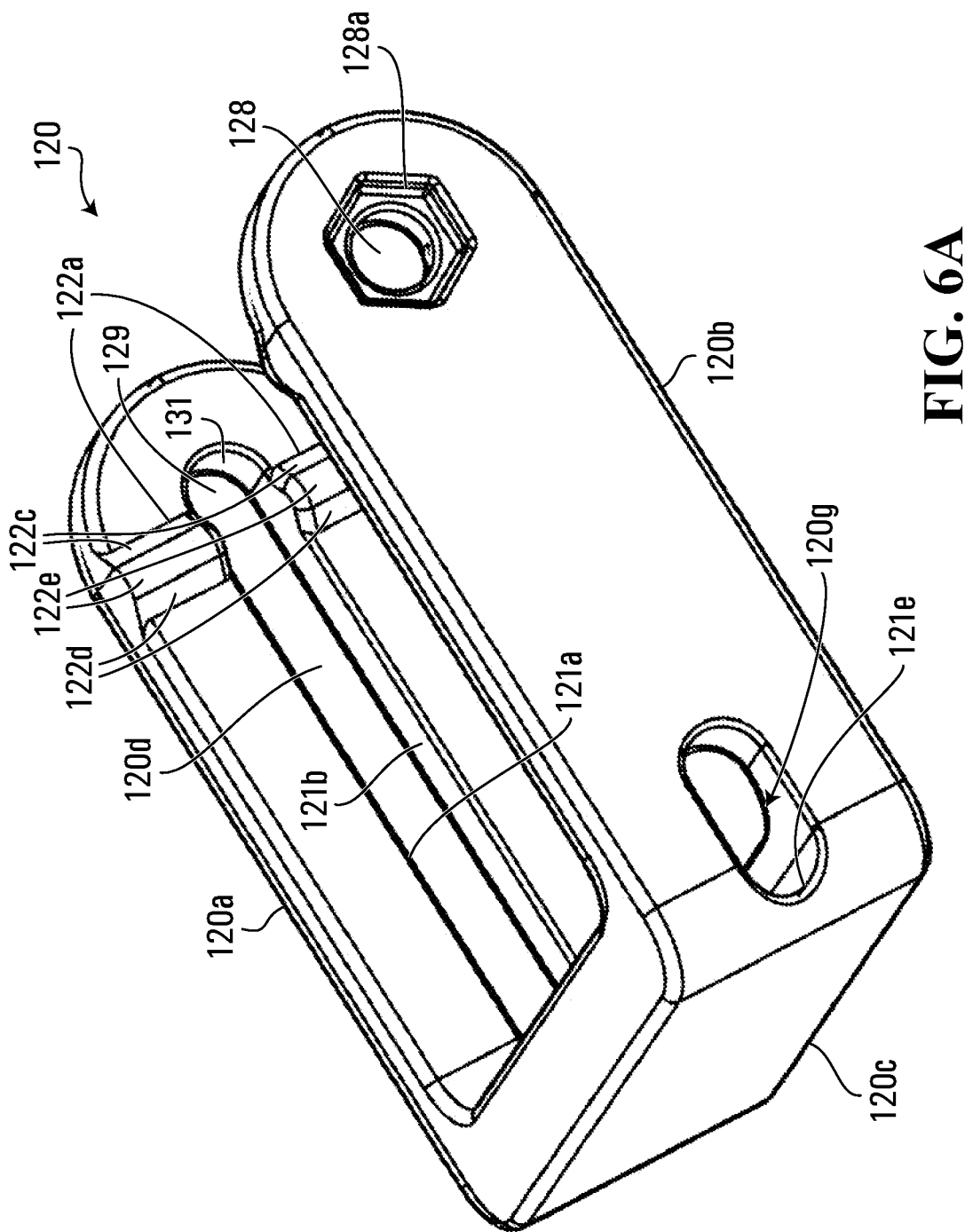
FIGS. 6A and 6B are perspective views of part of the clamping assembly of FIGS. 5A to 5E.
Figure 6B:
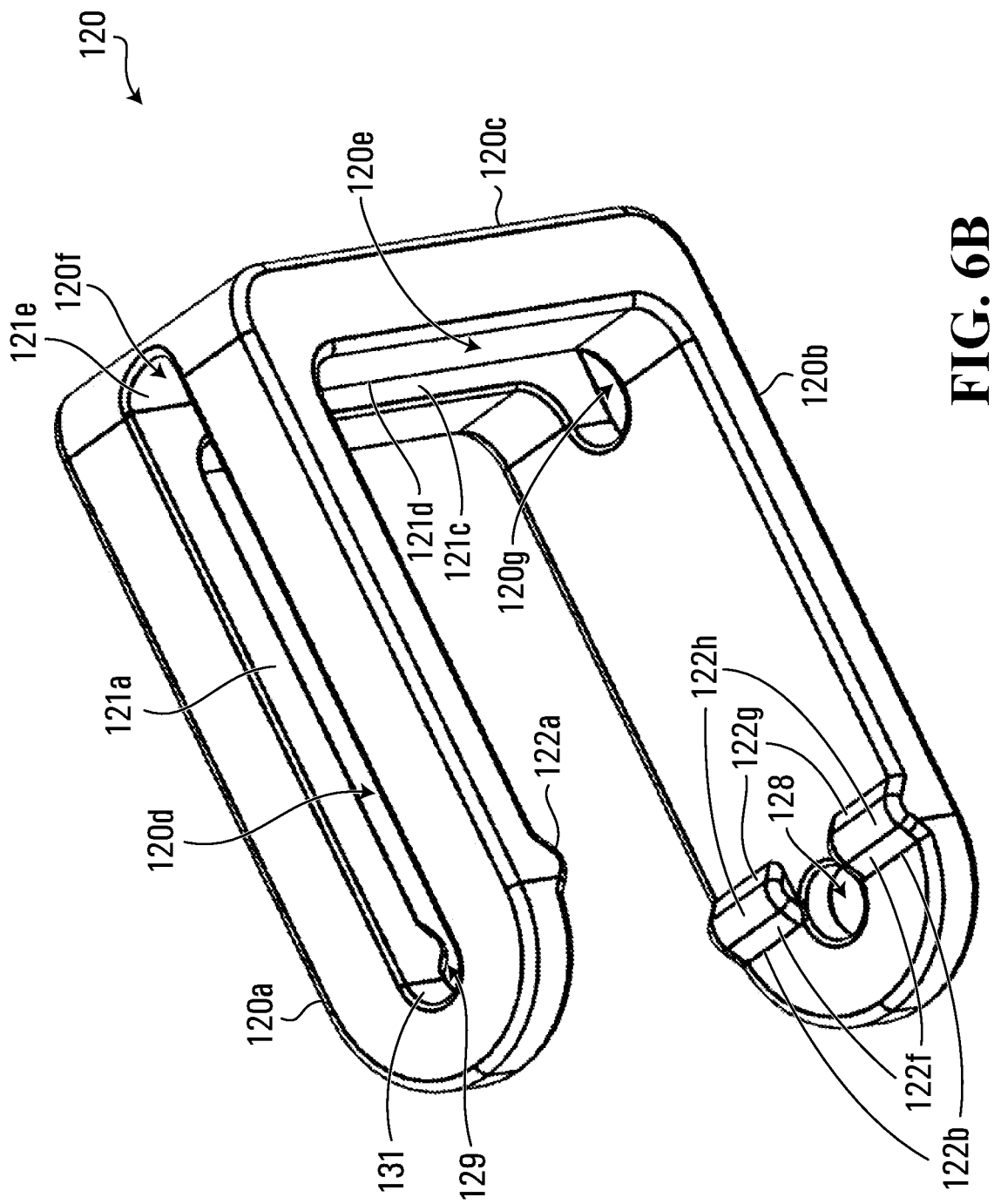

Referring to FIGS. 5A-E an embodiment of a clamping assembly 118 may comprise a clamping bracket 120, a clamping bolt 124 and a flanged nut 126. Clamping bracket 120 may comprise a longitudinally extending (axis X in FIG. 7C) upper clamping arm portion 120a, a longitudinally extending lower clamping arm portion 120b, inter-connected by a vertically extending (axis Y in FIG. 7C) medial connecting portion/member 120c (FIGS. 6A and 6B) and may form a generally C-shaped structure. The inner faces of upper clamping arm 120a, lower clamping arm portion 120b and medial connecting portion/member 120c are configured to extend around a support structure member 114 on three side surfaces 115a, 115b, 115d (FIG. 8) of its four side surfaces. Upper clamping arm 120a may have a recessed longitudinally extending channel 120d (FIGS. 6A and 6B), open along its length on at least an upper side (and preferably also on its lower side) for accommodating top end portion 116b of tine 116. Top end portion 116b may have its lower downward facing, cylindrical or curved edge surface positioned in contact with the top generally planar surface 115a of support structure member 114. Opposed inward facing, transversely spaced, longitudinally extending generally planar channel walls 121a, 121b may engage and snugly retain the side cylindrical or curved edge surface side edges of longitudinally extending angled portion 116b, to assist in holding top end portion 116b within channel 120d when clamping assembly 118 secures a tine 116 to support structure 114.

In some embodiments, angled portion 116b of tine member 116 may not be held or constrained directly against the upper surface 115a of a support structure 114 as described above. Instead, angled portion 116b may be constrained within longitudinally extending channel 120d by opposed inward facing, transversely spaced, longitudinally extending generally planar channel walls 1121*a*, 1121*b* and a bottom channel wall portion (not shown) that may constrain the side edge and bottom cylindrical or curved surfaces of longitudinally extending angled portion 1116*b*, to assist in holding top end portion 1116*b* within channel 1120*d* when clamping assembly 1118 secures a tine 1116 to support structure 114. In some embodiments, angled portion 116*b* may only be loosely constrained within channel 120*d*.

Figure 8:
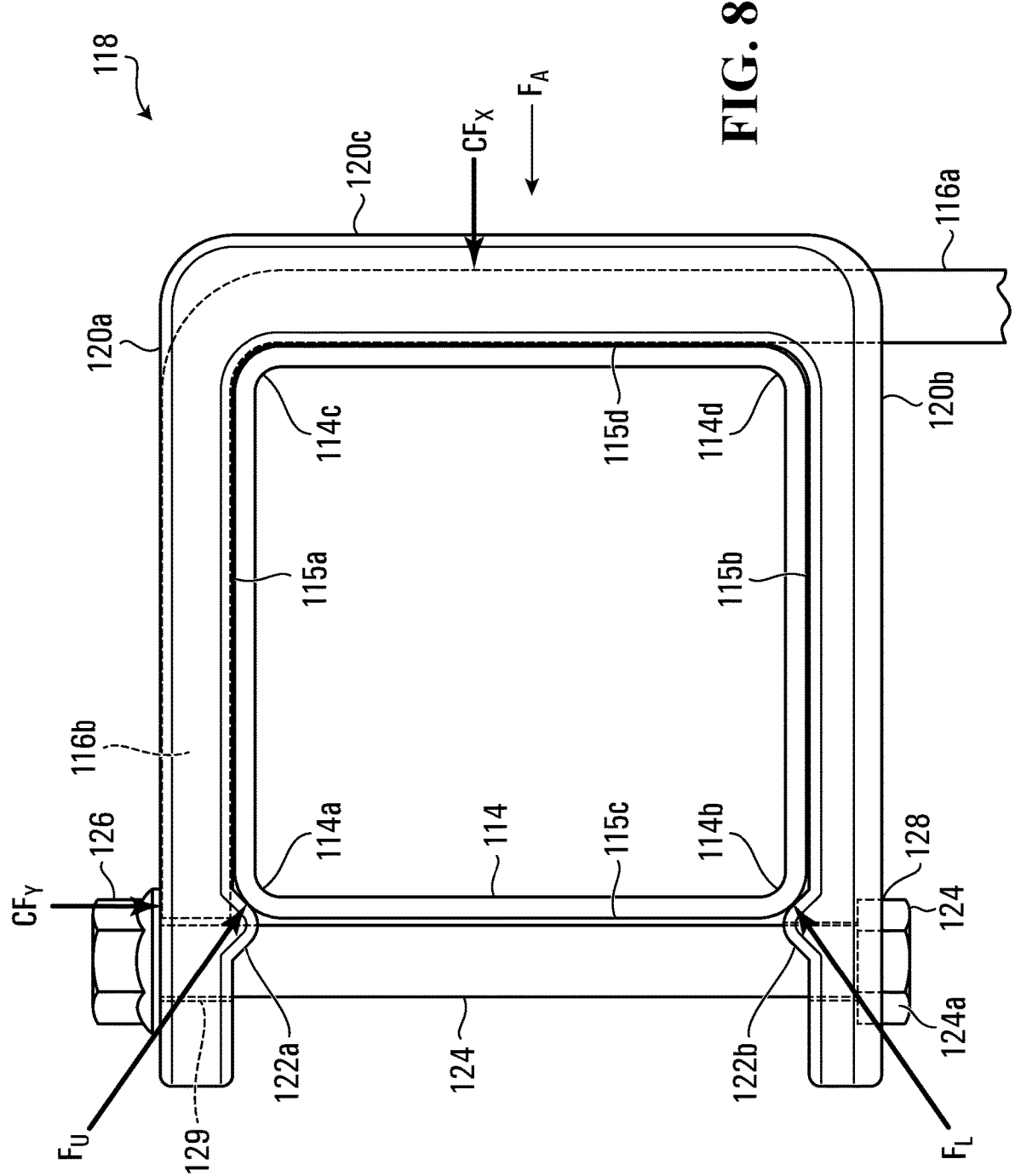
FIG. 8 is a semi-transparent side elevational view of a clamping assembly of FIGS. 5A-E, showing the securement of a tine to a support structure.

Medial connecting portion 120*c* of bracket 120 may have a recessed, vertically extending channel 120*e* extending along its length and may at an upper end portion join with an end portion of channel 120*d*, such that channel 120*e* extending in a vertical direction is in communication with channel 120*d* running in a longitudinal direction. An inward end portion 120*f* of channel 120*d* may lead to the upper end of channel 120*e*. Channel 120*e* may itself be open on at least its inward facing side and at both ends for accommodating an upper region of main leg portion 116*a* of tine 116 therein. In other embodiments channel 120*e* maybe be a generally cylindrical tube in shape. Channel 120*e* may be formed with a semi-cylindrical wall 121*e* (FIG. 6A) which, along with opposed inward facing, transversely spaced, longitudinally extending channel walls 121*c*, 121*d* (FIG. 6B) may engage and snugly retain the semi-cylindrical surface of the upper region of leg portion 116*a*, to assist in holding leg portion 116*a* within channel 120*d*. Leg portion 116*a* may have its inward facing, cylindrical or curved edge surface positioned in contact with the side generally planar surface 115*d* of support structure member 114 when clamping assembly 118 secures a tine 116 to a support structure 114 (FIG. 8).

Channels 120*d* and 120*e* thus co-operate to provide greater stability when clamping assembly 118 is used in securing tine 116 to a support structure 114.

The lower clamping arm 120*b* may also have an aperture 128 extending there through located at the distal end of lower clamping arm 120*b* for accommodating a clamping bolt 124. Aperture 128 may have a recessed, hexagonal and tapered opening portion 128*a* for locating a correspondingly shaped head 124*a* of clamping bolt 124 with a friction fit between opposed mating surfaces of head 124*a* of clamping bolt 124 and tapered opening portion 128*a*. Tapered opening portion 128*a* functions to engage with the hexagonal head of clamping bolt 124, preventing both vertical (y-axis on FIG. 7C) and rotational movement of clamping bolt 124.

In use of clamping assembly 118, bolt 124 may be disposed through aperture 128 of the lower clamping arm 120*b* and through an opening 129 at the distal end of channel 120*d* in the upper clamping arm 120*a*. Opening 129 is in part formed by the semi-cylindrical inward facing surface 131 (FIG. 6A) at the end portion of upper clamping arm 120*a*. Clamping bolt 124 may be secured via flanged nut 126.

Clamping bracket 120 may have a first pair of transversely oriented, and transversely spaced apart upper ribs/ridges 122*a* projecting vertically downwards from the inner face of upper clamping arm 120*a*. Upper ribs/ridges 122*a* may have outer faces 112*c*, inner faces 122*d* and peaks 122*e*. Clamping bracket 120 may also have a second pair of transversely oriented and transversely spaced apart lower ribs/ridges 122*b*, projecting vertically downwards upwards from the inner face of lower clamping arm 120*b*, respectively. Lower ribs/ridges 122*b* may have outer faces 112*f*, inner faces 122*g* and peaks 122*h*. When in position of support structure 114, inner faces 112*d* and 122*g* engage with the outer corners of support structure 114, as shown in FIG. 8. The ribs/ridges of laterally (transversely) spaced rib/ridge pair 122*a* and laterally (transversely) spaced rib pair 122*b* may be roughly v-shaped in cross-sectional profile. Peaks 122*e* and 122*h* may have a rounded profile. As will be further described below, by placing spaced apart upper ribs and spaced apart lower ribs on the inner surface of upper clamping arm 120*a* and the inner surface of lower clamping arm 120*b*, the stability of clamping bracket 120 is enhanced, securely locating clamping assembly 118 and a tine 116 held therein, on a tine support structure 114. Ribs 122*a* and 122*b* also function to assist in positioning clamping bracket 120 squarely on support structure 114.

Figure 7A:
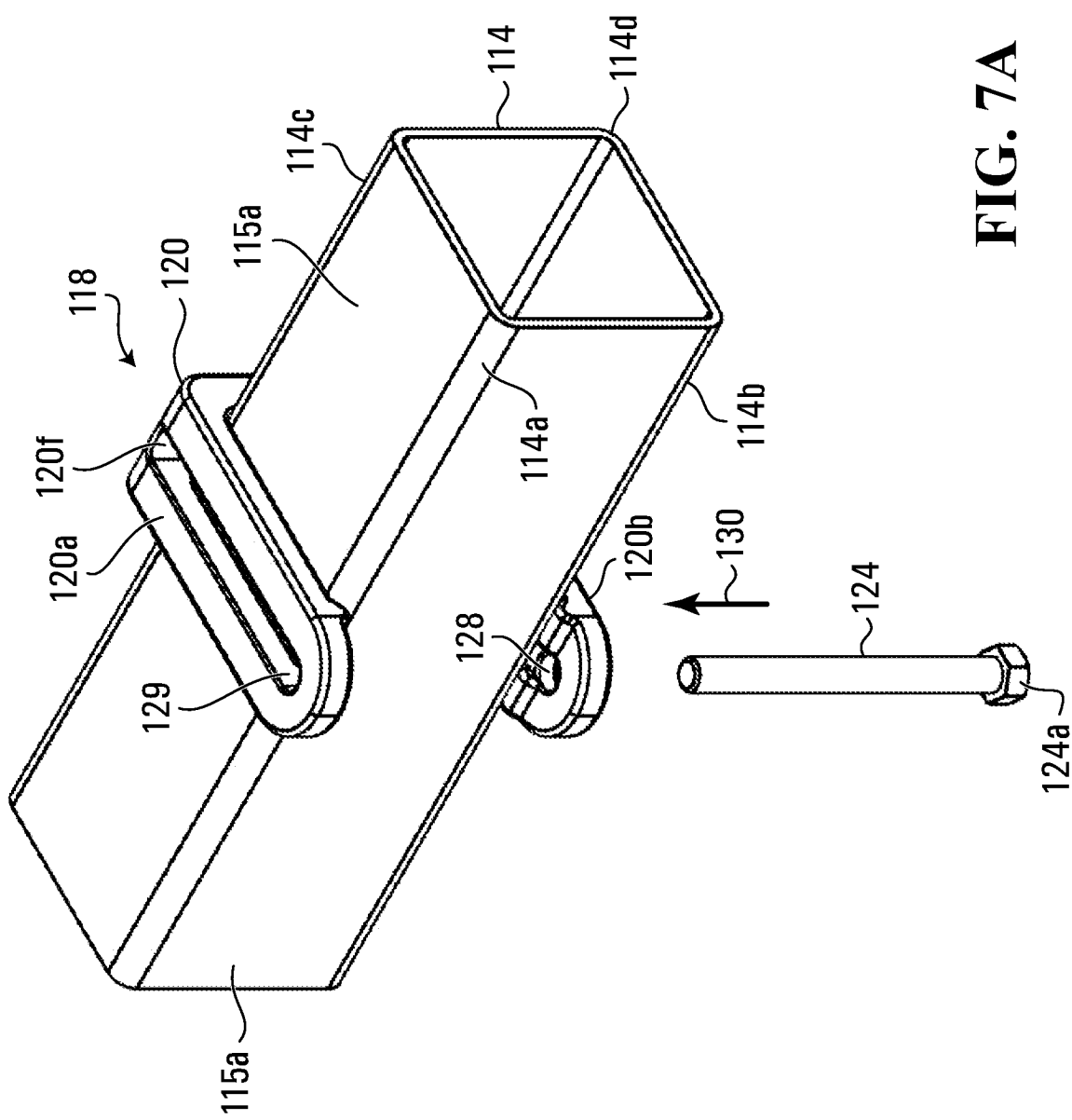
FIGS. 7A to 7C are perspective views showing the method of using the clamping assembly of FIGS. 5A-E during the installation of a tine.
Figure 7B:
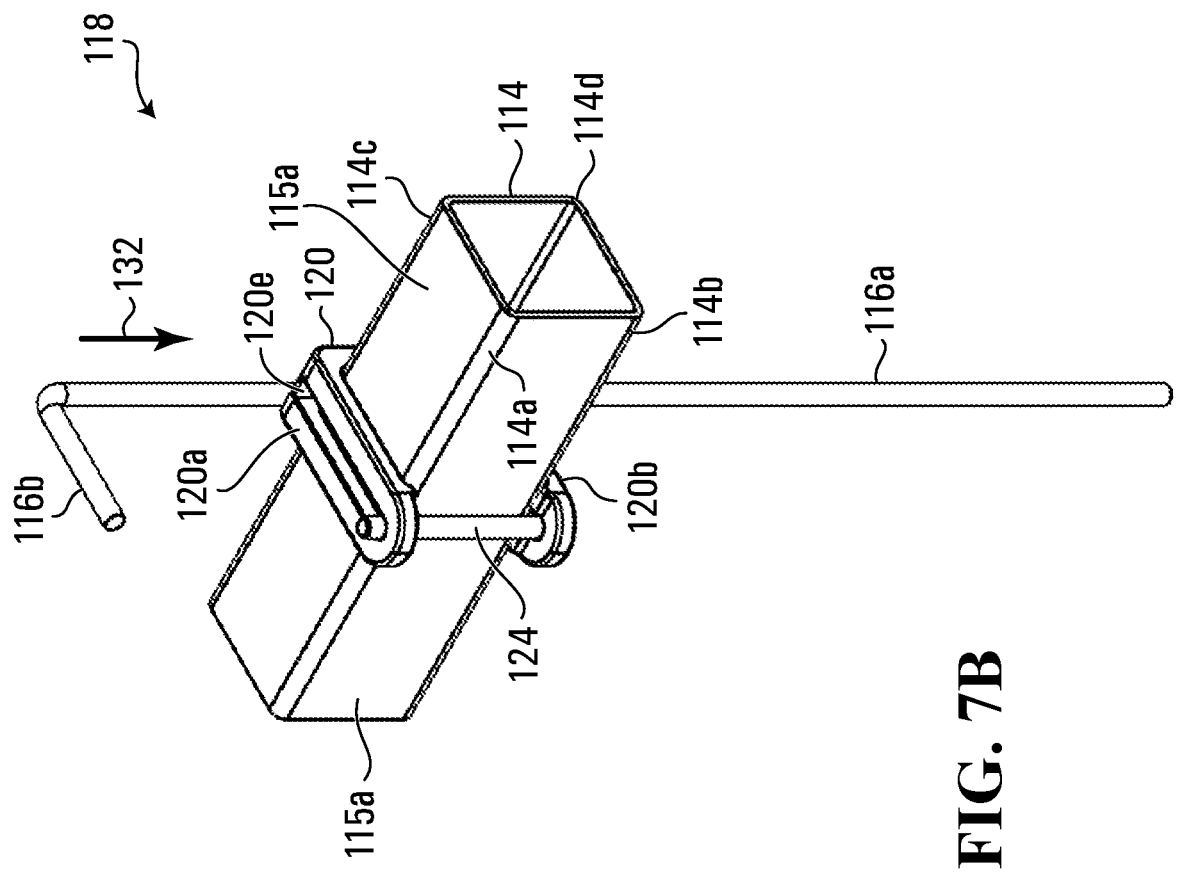
Figure 7C:
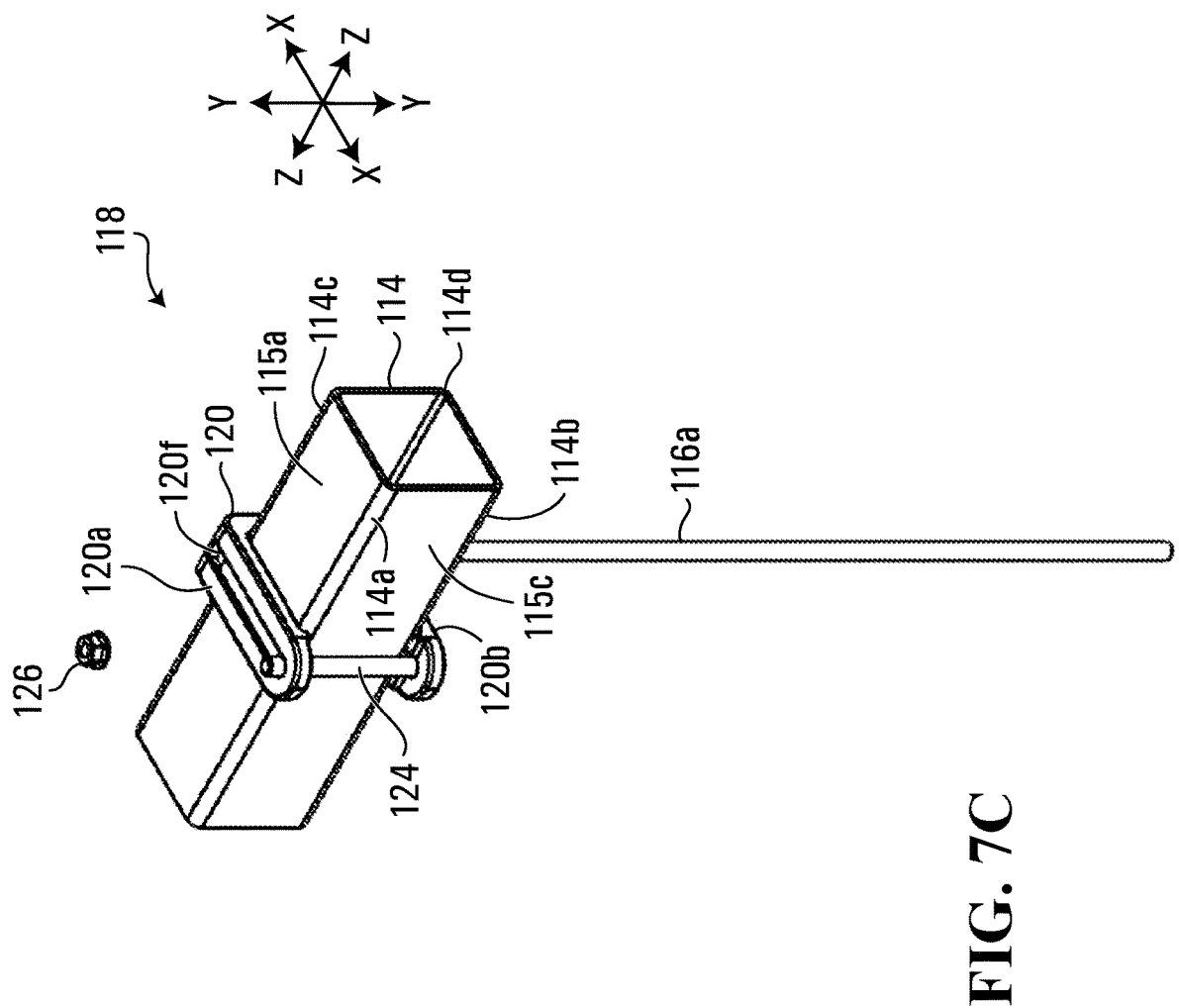

With reference to FIGS. 7A-C, a method for mounting tines 116 to a support structure 114 will now be described. Starting with reference to FIG. 7A, clamping bracket 120 is inserted over a support structure 114 so that it is positioned generally against three sides of the support structure 114. Due to the sizing of clamping bracket 120 and the presence of spaced apart upper and lower ribs 122*a* and 122*b*, the outer faces 122*c* and 122*f* of spaced apart pairs of upper and lower ribs 122*a* and 122*b* are in contact with the respective upper and lower rear corners 114*c* and 114*d* of support structure 114. A directional force (FA on FIG. 8) may be required to allow the clamping bracket 120 to slide and be forced onto support structure 114. The choice of material(s) from which clamping bracket 120 can be made, to enable clamping bracket 120 to be stiff but have some degree of flexibility. When force FA is provided, by a tool such as a rubber mallet, the force is translated to the ribs, acting against support structure 114, causing the spacing between upper and lower clamping arms 120*a* and 120*b* to widen as the upper and lower clamping arms to deflect outwards, allowing the upper and lower clamping arms to slide over the respective upper surface 115*a* and lower surface 115*b* of a support structure 114. As explained above, peaks 122*e* and 122*h* may have a rounded profile which allows spaced apart upper and lower ribs to slide over the respective upper surface 115*a* and lower surface 115*b* of a support structure 114. Once in position, the inner faces 122*d* and 122*g* of spaced apart, lateral pairs of upper and lower ribs 122*a* and 122*b* are in contact with the respective upper and lower front corners 114*a* and 114*b* of support structure 114 (FIG. 5*d*) and function to lock clamping bracket 120 squarely in position on the corners of support structure 114. Thus clamping bracket 120, and a tie member 116 held therein, may be properly aligned, squarely on support structure 120. Furthermore, once clamping bracket is locked in position, further assembly may be effectively be handsfree, i.e. can be competed with tools and without the need to hold clamping bracket 120 in place. The resilient nature of the metal or other material of clamping bracket 120 and the presence of upper ribs 122*a*, results in upper force $F_U$ acting on the corner area at the portion joining upper surface 115*a* and outer vertical surface 115*c* of the support structure 114. Similarly, the resilient nature of the metal or other material of clamping bracket 120 and the presence of lower ribs 122*b* results in a lower force $F_L$, acting on the corner area at the portion joining lower surface 115*b* and outer vertical side surface 115*c* of the support structure 114. These forces $F_U$ and $F_L$ have force components that are directed inwardly toward the outward facing surface 115*c* and provides an enhanced grip holding clamping bracket 120 in place on the support structure 114 during assembly even if clamping bolt 124 and flanged nut 126 aren't in place.

Next, the shaft of a clamping bolt 124 (with a threaded main body) may be inserted through lower bolt aperture 128 in the direction indicated by arrow 130 on FIG. 7A until the threaded end of the shaft protrudes through opening 129 at the distal end of channel 120*d*. As described above, the portion of lower bolt aperture 128 that recesses the hexagonal head of clamping bolt 124 may be hexagonal in cross section and slightly tapered. This serves to retain clamping bolt 124 in position within clamping mechanism 120 throughout the bolt mounting step (and during any removal), eliminating the need for the hexagonal head of clamping bolt 124 to be held from below by another means/device such as a wrench or socket during tightening of threaded flanged nut 126. This may be convenient as lower bolt aperture may effectively act as a lower wrench in holding bolt 124 from rotation when nut 126 is being applied thereto, eliminating the need for an operator to crawl under tine harrow apparatus 102 to access the head of bolt 124 and may therefore reaming standing during service. Furthermore, when a directional force (FA on FIG. 8) is applied to allow the clamping bracket 120 to slide onto support structure 114, bolt 124 is held in place, negating the need for a operator to hold bolt 124 in place during this step.

Referring to FIG. 7B, next the main leg portion 116a of tine 116 is inserted downwards through the inward end portion of upper clamping arm 120a, in the direction indicated by arrow 132, into and through the channel 120e in medial connecting portion 120c, so that it will extend out through opening 120g (FIG. 6a) that extends through lower clamping arm 120b. At the end of this downward movement, angled portion 116b of tine 116 is received through the upper opening into channel 120d of upper clamping arm 120a.

Next, with reference to FIG. 7C, the threaded end of clamping bolt 124 is secured with flanged and threaded nut 126, which engages the upper surface of the terminal end of the angled portion 116b of tine 116, preventing vertical movement of tine 116 and providing a downwardly directed clamping force $CF_Y$ onto the upward facing surface area of angled portion 116b of tine 116. Clamping bracket 120 is resiliently deformable and deflectable and the action of tightening flanged nut 126 secures clamping bracket 120, keeping inner faces 122d and 122g of spaced apart upper and lower ribs 122a and 122b in contact with the respective upper and lower front corners 114a and 114b of support structure 114, and increases the forces $F_U$ and $F_L$ including the force components that are acting upon the outward facing surface 115c of the support structure, as well as the corresponding opposed clamping force $CF_X$ exerted substantially by medial connecting portion 120c of bracket 120c (in particular by semi-cylindrical wall 121e). This will have the effect of enhancing the clamping force on the upper region of leg portion 116a between the inward and side facing surfaces of channel 120e and the outward surface 115c and the corresponding opposite inward surface 115d of the support structure 114, as the upper region of leg portion 116a is sandwiched between medial connecting portion 120c of bracket 120 and the inward surface 115d of support structure 114, resulting in a secure and stable attachment of clamping bracket 120 and the tine 116 held therein, to support structure 114, as shown in FIG. 8. This arrangement may be reduce or substantially eliminate lateral/transverse movement of clamping assembly 118 (Z direction in FIG. 7C) on support structure 114 and as such, may ensure that the spacing of tines 116 on harrow apparatus 102 is maintained when ground engaging tasks are performed.

It should also be noted that providing a pair of laterally spaced upper ridges 122a on either side of channel 120d of upper clamping arm 120a, (which are vertically and longitudinally aligned with lower ridges 122b) laterally spaced apart forces $F_U$ will be acting through each of the inner faces 122d of upper ridges 122a upon support structure 114. Similarly, providing a pair of laterally, spaced lower ridges 122b, on upper clamping arm 120b, laterally spaced apart forces $F_L$ will be acting through each of the inner faces 122g of lower ridges 122b upon support structure 114. By providing laterally spaced upper and lower pairs of ridges each of the four ridges 122a, 122b has an engaging surface edge which applies a load there through when the clamping assembly 118 is tightened, and this may further enhance the ability of clamping assembly 118 to resist transverse movement along support structure 114, particularly during use of the harrow apparatus 102.

Figure 9:
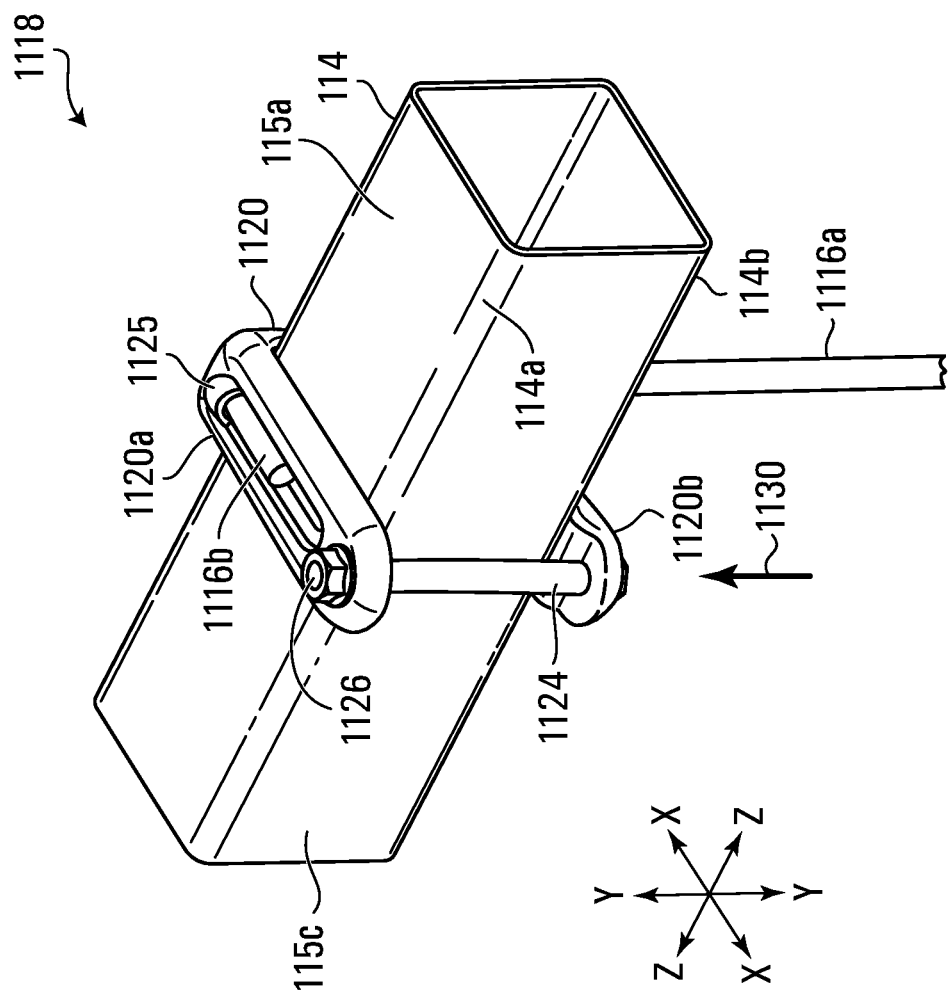
FIG. 9 is a perspective view of another embodiment of a clamping assembly for clamping tines to the support structure in the harrow apparatus of FIG. 3A.
Figure 10:
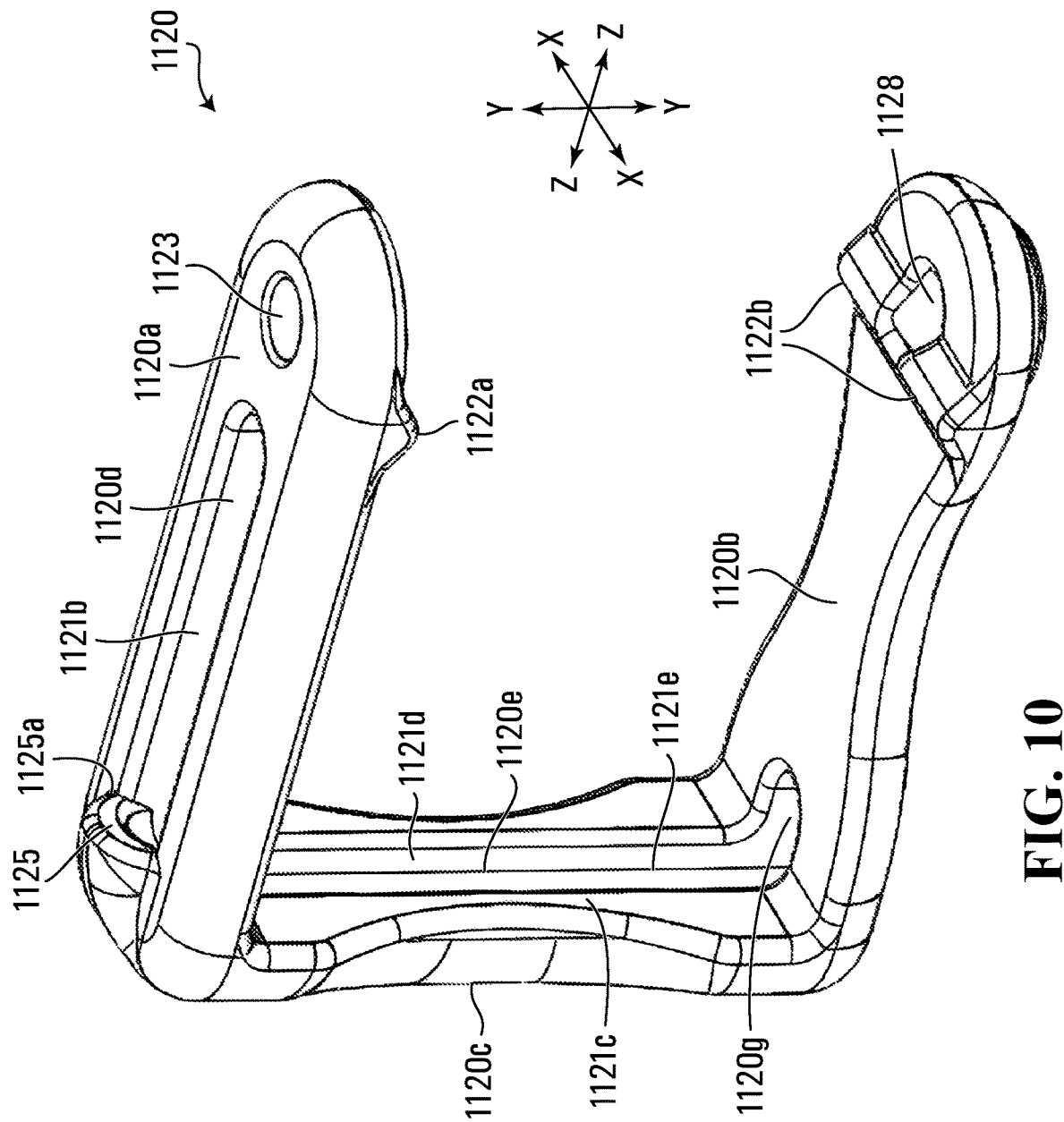
FIG. 10 is a perspective view of part of the clamping assembly of FIG. 9.
Figure 11:
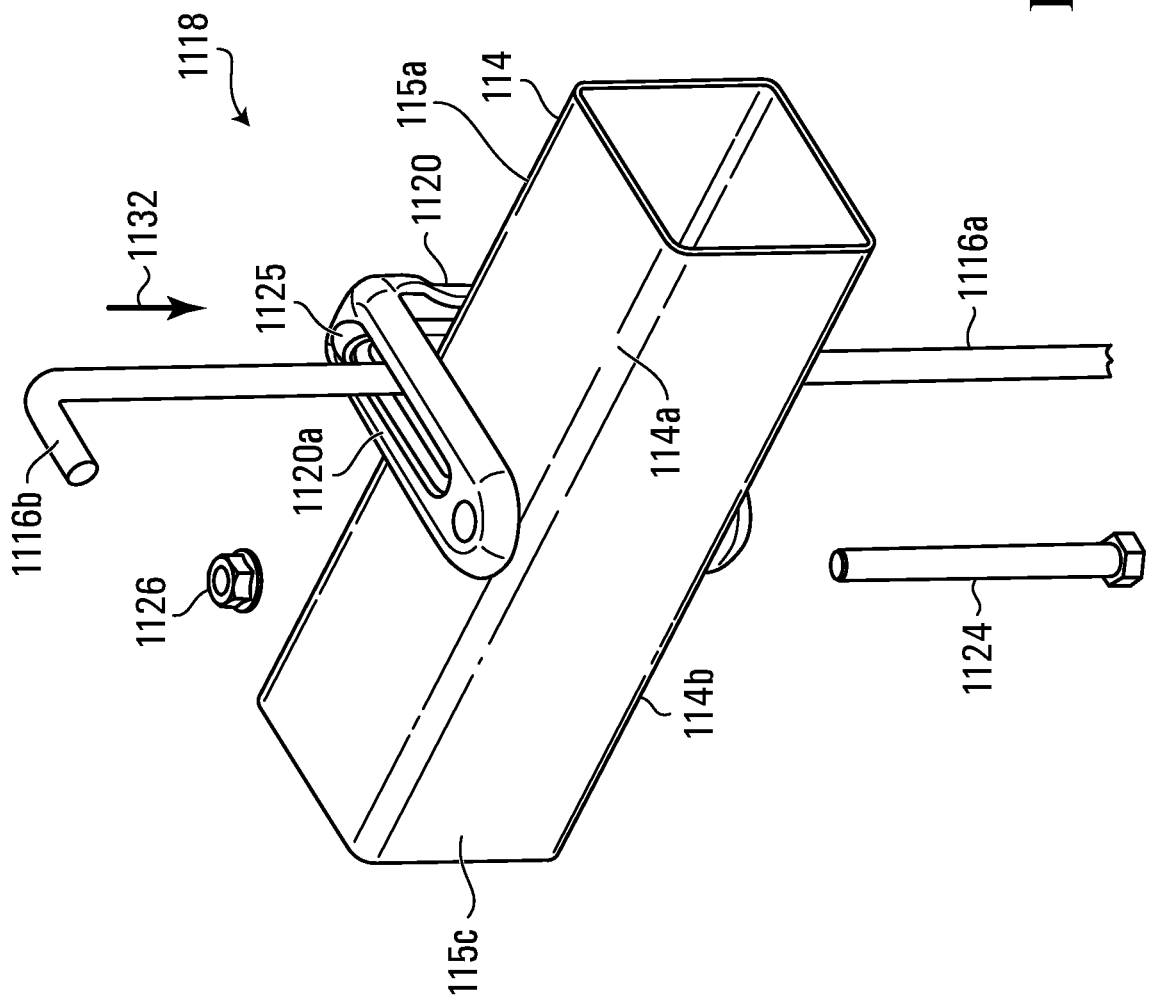
FIG. 11 is a perspective view showing the method of using the clamping assembly of FIG. 9 during the installation of a tine.
Figure 12:
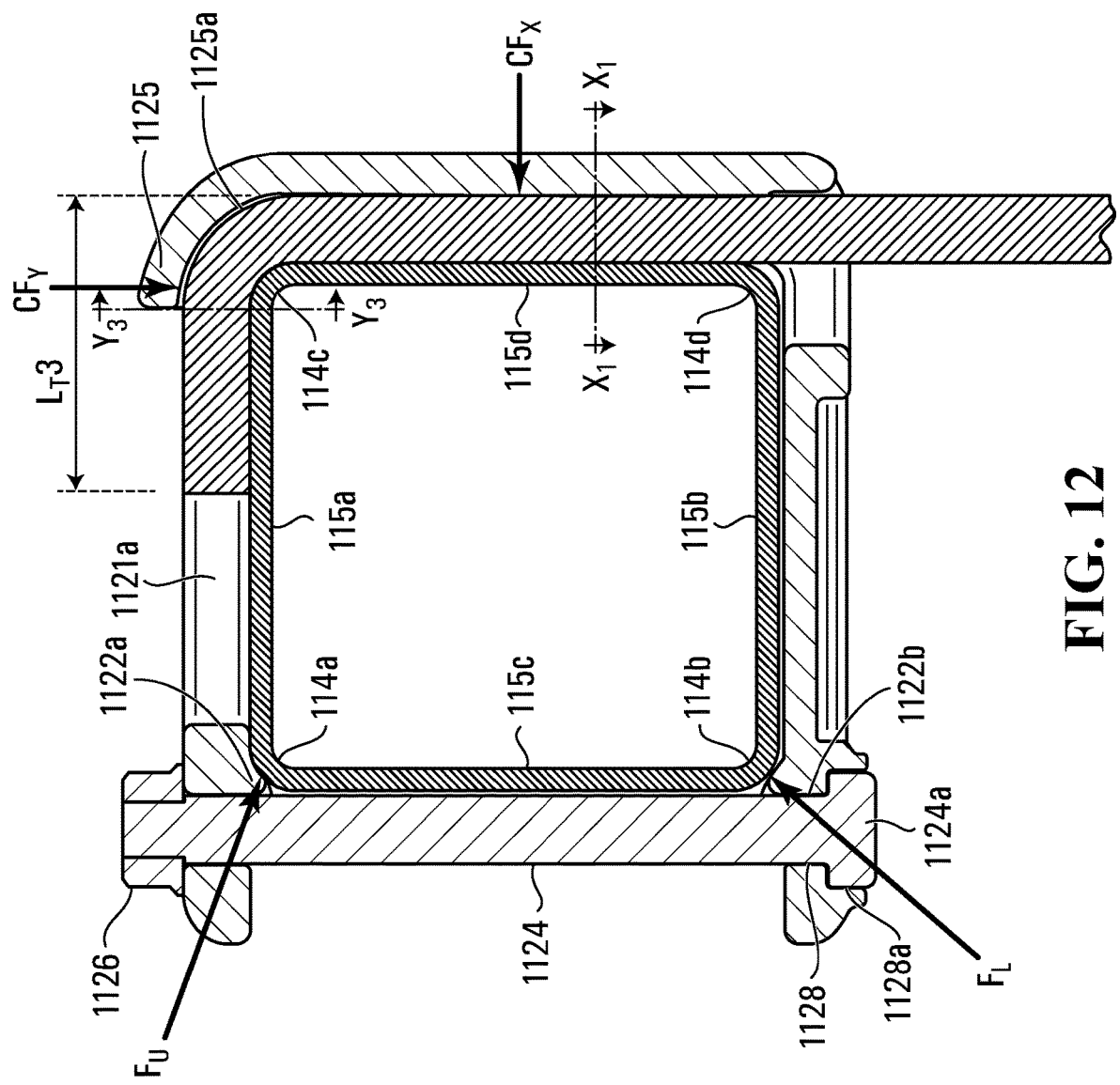
FIG. 12 is a cross-sectional side elevational view of a clamping assembly of FIG. 9, showing the securement of a tine to a support structure.

Referring to FIGS. 9-13 further improved embodiments of clamping assemblies 1118 and 2118 are shown. As shown in FIGS. 9-12, clamping assembly 1118 may comprise a clamping bracket 1120, a clamping bolt 1124 and a flanged nut 1126. Flanged nut 1126 may be a crimp-type lock nut. Clamping bracket 1120 is configured to retain tine 1116, as shown in FIG. 9. Tine 1116 is generally similar to tine 116 described above, having a generally L-shape with a main leg/body portion 1116a and an angled top portion 1116b having a length LT3 (FIG. 12). However, in this embodiment LT3 of tine 1116 may be less than LT2 of tine 116 such that when in position on support structure 114, angled top portion 1116b extends only a partial distance of top surface 115a of support structure 114.

Clamping bracket 1120 may comprise a longitudinally extending (axis X in FIG. 10) upper clamping arm portion 1120a, a longitudinally extending lower clamping arm portion 1120b, inter-connected by a vertically extending (axis Y in FIG. 10) medial connecting portion/member 1120c (FIGS. 9 and 10). The inner faces of upper clamping arm 1120a, lower clamping arm portion 1120b and medial connecting portion 1120c are configured to engage around a support structure member 114 on three surfaces 115a, 115b, 115d (FIG. 12) of its four side surfaces. Upper clamping arm 1120a may have a recessed longitudinally extending channel 1120d (FIG. 10), open along its length on at least an upper side (and preferably also on its lower side) for accommodating the top end portion 1116b of tine 1116. Top end portion 1116b may have its lower downward facing, cylindrical or curved edge surface positioned in contact with the top generally planar surface 115a of support structure member 114. Opposed inward facing, transversely spaced, longitudinally extending generally planar channel walls 1121a, 1121b may engage and snugly retain the side cylindrical or curved edge surface side edges of longitudinally extending angled portion 1116b, to assist in holding top end portion 1116b within channel 1120d when clamping assembly 1118 secures a tine 1116 to support structure 114.

The upper clamping arm 1120a may also have an aperture 1123 extending therethrough located at the distal end of upper clamping arm 1120a for accommodating the threaded end of a clamping bolt 1124 therethrough (FIG. 10).

Medial connecting portion 1120c of bracket 1120 may have a recessed, vertically extending channel 1120e extending along its length and may at an upper end portion join with an end portion of channel 1120d, such that channel 1120e extending in a vertical direction is in communication with channel 1120d running in a longitudinal direction. Channel 1120e may itself be open on at least its inward facing side and at the end proximal to lower clamping arm 1120b for accommodating an upper region of main leg portion 1116a of tine 1116 therein. The end of channel 1120e, proximal to upper clamping arm 1120a terminates at an inner surface 1125a of medial channel end wall 1125, which assists in holding and constraining top end portion 1116b of tine 1116 within channels 1120c and 1120d (FIGS. 9 and 10). Medial channel end wall 1125 may be formed as an integral part of the casting of bracket 1120 and projects upwards from either side of channel 1120d at the proximal end of the outer face of clamping arm 1120a. Inner surface 1125a may define a shape that may be approximately one quarter of a sphere (eg. a quarter spherical dome cap shape) and assists in constraining tine 1116 in close proximity to support structure 114.

Figure 12B:
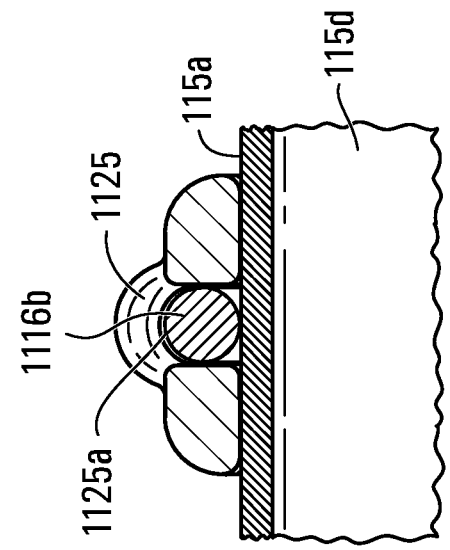
FIG. 12B is a cross-sectional view of the clamping assembly in FIG. 12, viewed at section line Y3-Y3 in FIG. 12.
Figure 12A:
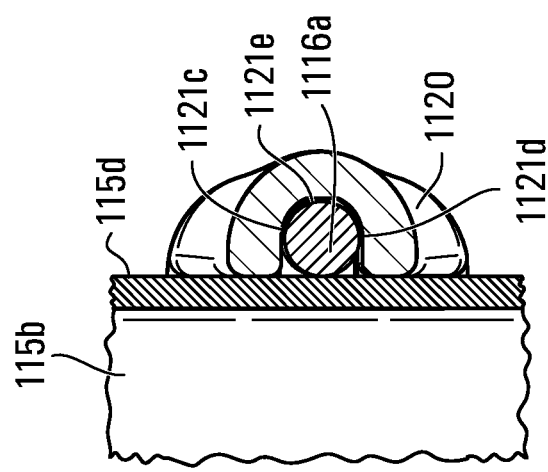
FIG. 12A is a cross-sectional view of the clamping assembly in FIG. 12, viewed at section line Xi-Xi in FIG. 12.

Channel 1120e may be formed with a semi-cylindrical wall 1121e (FIG. 10) which, along with opposed inward facing, transversely spaced, longitudinally extending channel walls 1121c, 1121d and inner surface 1125a (FIG. 10) may engage and snugly retain the semi-cylindrical surface of the upper region of leg portion 1116a, to assist in holding leg portion 1116a within channel 1120e. As shown in greater detail in FIGS. 12A and 12B, tine 1116 is constrained in a close proximity to support structure 114. Leg portion 1116a may have its inward facing, cylindrical or curved edge surface positioned in contact with the side generally planar surface 115d of support structure member 114 when clamping assembly 1118 secures a tine 1116 to a support structure 114 (FIG. 12).

Channels 1120d and 1120e thus co-operate to enhance stability when clamping assembly 1118 is used in securing tine 1116 to a support structure 114.

The lower clamping arm 1120b may also have an aperture 1128 extending there through located at the distal end of lower clamping arm 120b for accommodating a clamping bolt 1124. Aperture 1128 may have a recessed, hexagonal and tapered opening portion 1128a for locating a correspondingly shaped head 1124a of clamping bolt 1124 with a friction fit between opposed mating surfaces of head 1124a of clamping bolt 1124 and tapered opening portion 1128a. Tapered opening portion 128a functions to engage with the hexagonal head of clamping bolt 1124, preventing both vertical (y-axis on FIG. 9) and rotational movement of clamping bolt 1124.

In use of clamping assembly 1118, bolt 1124 may be disposed through aperture 1128 of the lower clamping arm 1120b and through aperture 1123 at the distal end of upper clamping arm 1120a. Clamping bolt 1124 is secured via flanged nut 1126.

Clamping bracket 1120 may have a first pair of transversely oriented, and transversely spaced apart upper ribs 1122a projecting vertically downwards from the inner face of upper clamping arm 1120a. Similarly, clamping bracket 1120 may also have a second pair of transversely oriented and transversely spaced apart lower ribs 1122b, projecting vertically downwards upwards from the inner face of lower clamping arm 1120b, respectively. Ribs 1122a and 1122b may substantially function in the same manner as ribs 122a and 122b on clamping bracket 120, as described above.

The method for mounting a tine 1116 to a support structure 114 using clamping bracket 1120 is similar to the method described above for clamping bracket 120 with the exception that tine 1116 is first inserted before bracket 1120 is fully positioned on support structure 114 to allow tine 1116 to clear medial channel end wall 1125. With reference to FIG. 11, with bracket 1120 in the position shown, the main leg portion 1116a of tine 1116 is inserted downwards in the direction indicated by arrow 1132 through the inward end portion 1120e of upper clamping arm 1120a, in the and through the channel 1120e in medial connecting portion 1120c, so that it will extend out through opening 1128 (FIG. 10) that extends through lower clamping arm 1120b. At the end of this downward movement, angled portion 1116b of tine 1116 is received through the upper opening into channel 1120d of upper clamping arm 1120a. Next clamping bracket 1120 can be fully inserted over support structure 114 into the position shown in FIG. 9, similar to as described above for bracket 120. As shown in greater detail in FIG. 12B, inner surface 1125a of medial channel end wall 1125 may engage and snugly retain and constrain the semi-cylindrical surface of the upper region of leg portion 1116a, as shown in greater detail in FIG. 12B.

Next, a clamping bolt 1124 may be inserted through lower bolt aperture 1128 in the direction indicated by arrow 1130 in FIG. 9 until the threaded end protrudes through opening 1123 at the distal end of upper clamping arm 1120. As described above, the portion of lower bolt aperture 1128 that recesses the hexagonal head of clamping bolt 1124 may be hexagonal in cross section and slightly tapered. This serves to retain clamping bolt 1124 in position within clamping mechanism 1120 throughout the bolt mounting step (and during any removal), eliminating the need for the hexagonal head of clamping bolt 1124 to be held from below by another means/device such as a wrench or socket during tightening of flanged nut 1126.

Next, the threaded end of clamping bolt 1124 is secured with flanged and threaded nut 1126, which engages the upper surface upper clamping arm 1120a. Clamping bracket 1120 is resiliently displacable and the action of tightening flanged nut 1126 secures clamping mechanism 1120, keeping spaced apart upper and lower ribs 1122a and 1122b in contact with the respective upper and lower front corners 114a and 114b of support structure 114. This will also have the effect of enhancing the clamping force on the upper region of leg portion 1116a between the inward and side facing surfaces of channel 1120e, inner surface 1125a and the inward surface 1115d of the support structure 114, as the upper region of leg portion 1116a is sandwiched there between. There will be an increase in the forces $F_U$ and $F_L$ including the force components that are acting upon the outward facing surface 115c of the support structure as well as the corresponding opposed clamping force $CF_X$ exerted substantially by medial connecting portion 1120c of bracket 120c (in particular by semi-cylindrical wall 1121e) on upper region of leg portion 1116a. Also, by application of the forces $F_U$ and $F_L$ including the force components thereof that are acting upon the upper facing surface 115a and the downward facing surface 115b of the support structure), a corresponding downward clamping force $CF_Y$ is achieved acting through medial channel end wall 1125 on the upper surface of angled end portion 1116b. The result is a secure and stable attachment of bracket 1120 and the tine 1116 held therein, to support structure 1114, as shown in FIGS. 9 and 12.

As described above, movement of tine 1116 along (axis Y in FIG. 9) is partially prevented, by placing medial channel end wall 1125 at the end of channel 1120c, proximal to upper clamping arm 1120a, removing the necessity to retain the top end portion 1116b using flanged nut 1126. As result of this, bracket 1120 can accommodate a variety of different tines 1116 having angled top portion 1116b with varying lengths LT3, such as for example in the range of 1 to 3 inches. One advantage of this is that bracket 1120 does not require stringent manufacturing tolerances for length LT3 on tine 1116.

Through the arrangement described above, tine 1116 and clamping assembly 1118 stay in position on support structure 1114, with bolt 1124 and nut 126 affixed tightly together. This may save an operator a substantial amount of time as the requirement to periodically re-tighten bolt 1124 and nut 1126 or re-position clamping assembly 1118 on support structure 1114 is substantially reduced or even eliminated. Furthermore, even if nut 1126 and bolt 1124 were to become detached (or a operator forgot to install them, for example), through providing laterally spaced upper and lower pairs of ridges on clamping bracket 1120 and channel 1120e with end wall 1125, clamping bracket 1120 will not become detached from support structure 114 and tine 1116 will remain constrained within clamping assembly 1118 as described above. This is beneficial because either clamping bracket 1120 or tine 1116 may cause significant damage and down time if it they become disengaged from a support structure 1114, fall onto the ground surface and for example, are later drawn into the workings of other agricultural equipment, such as a combine harvester for example.

Figure 13:
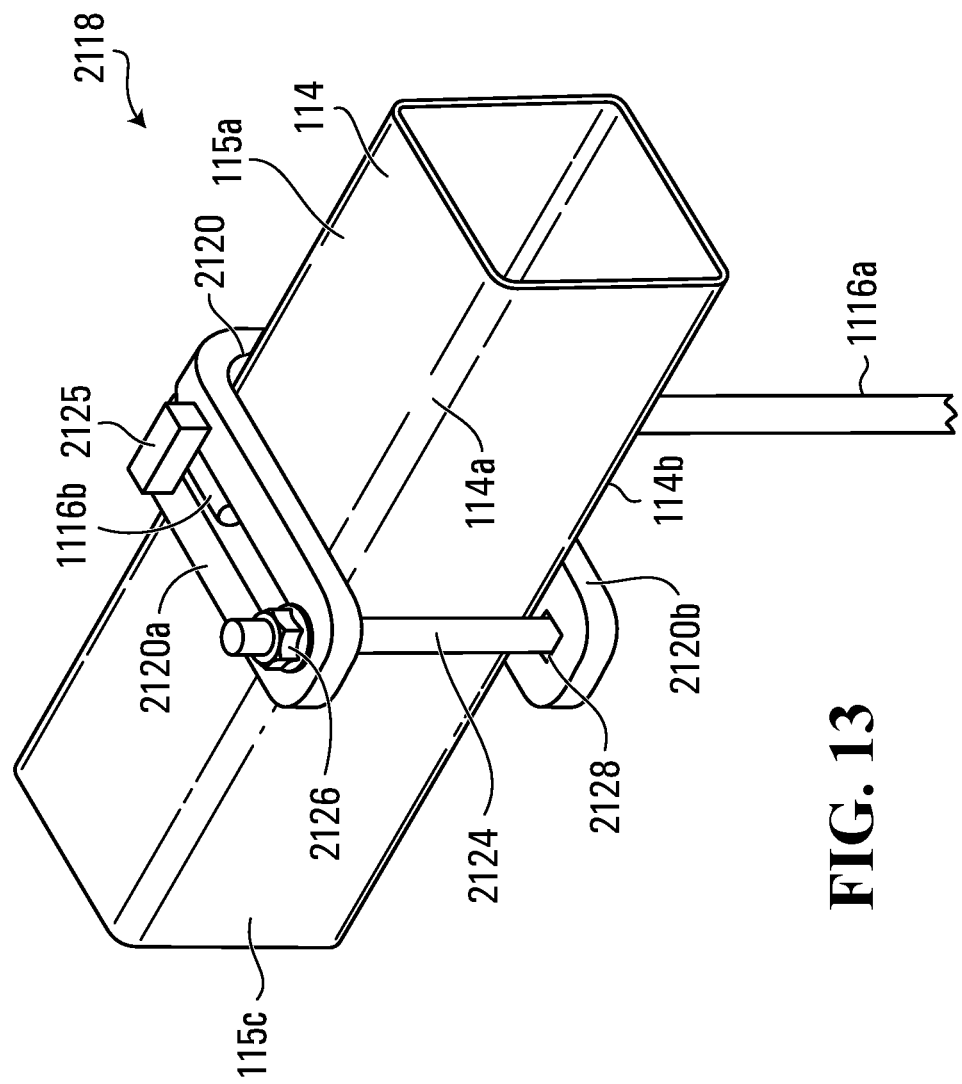
FIG. 13 is a perspective view of another embodiment of a clamping assembly for clamping tines to the support structure in the harrow apparatus of FIG. 3A.

Another embodiment of a clamping assembly 2118 is shown in FIG. 13, comprising a clamping bracket 2120, which operates substantially the same as clamping bracket 1120 described above. In this embodiment medial channel end wall 2125, similar to end wall 1125 described above, is formed from a section of a suitable material, for example rectangular/cuboid steel bar attached to the top surfaces of the channel walls by any suitable method such as welding. Medial channel end wall 2125 is located thus on the top surface 2120a of bracket 2120 and spans the top open channel, which functions in a similar manner to medial channel end wall 1125 on bracket 1120, assisting in holding top angled end portion 1116b of tine 1116 in the position shown in FIG. 13, constraining tine 1116 in close proximity to support structure 114.

Clamping bracket 2120 may or may not include upper and lower ridges on an upper clamping arm 2120a and a lower clamping arm 2120b.

Similar to clamping bracket 1120 described above, clamping bracket 2120 may include lower clamping arm 2120b with an aperture 2128 extending therethrough located at the distal end of lower clamping arm 2120b for accommodating a clamping bolt 2124. In this embodiment, aperture 2128 may have a generally square shaped cross-section configured for locating a correspondingly square shaped head portion of a square carriage bolt 2124 therewithin. Aperture 2128 is configured to engage, snugly retain and prevent rotational movement of the square portion of carriage bolt 2124. Furthermore, the square portion of carriage bolt 2124 may have a slight inwards taper, functioning to assist in retaining carriage bolt 2124 within aperture 2128. Clamping bolt 2124 may be secured via flanged nut 2126.

On occasion it may be required to inter-change/replace a tine 116 (or a plurality of tines) due to reasons such as for example; changing soil conditions, mechanical failure or when conducting multiple passes over the same ground. In order to exchange one tine 116 for another tine 116, flanged nut 126 and bolt 124 are removed and then tine 116 is lifted upwards by extracting main portion 116a of the tine through channels 120d and 120e in connecting portion 120c. A replacement tine can then be inserted as described above. Similarly, when removing a tine 1116, flanged nut 1126 and bolt 1124 are removed and also clamping bracket 1120 is partially withdrawn in a longitudinal direction (eg. approximately one inch) from support structure 114 before extracting main portion 1116a of the tine vertically through channels 1120d and 1120e in connecting portion 1120c (without such vertical movement being impeded from such movement by medial channel end walls 1125/2125).

Clamping brackets 120, 1120 and 2120 may be made as an integrally formed unitary piece, from one or more suitable materials, for example a ductile casting or forging of steel.

Clamping bolt 124 and flanged nut 126 may be made from any suitable material such as a grade 8 steel.

Clamping assembly 118, 1118 and 2118 may be transversely positioned at or 113 moved to any location along the length of support structure 114. This allows both the spacing and total number of tines of harrow apparatus 102 to be customised according to particular requirements, for example soil conditions.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. An agricultural implement assembly comprising:
    a support frame comprising an elongated tine support structure;
    a tine member comprising an elongated body portion and an angled end portion, wherein said angled end portion and an upper region of said elongated body portion of said tine member are oriented at an interior angle of between 85 degrees and 95 degrees to each other;
    wherein said tine support structure has at least three side surfaces that are oriented at approximately 90 degrees to each other, and wherein said angled end portion of said tine member is configured to be held against or in close proximity to said tine support structure at an upper side surface of said three side surfaces of said tine support structure and said upper region of said elongated body portion of said tine member is configured to be held against or in close proximity to said tine support structure at an inner side surface of said three side surfaces of said tine support structure;
    a clamping mechanism operable for securing said tine member to said tine support structure;
    said clamping mechanism comprising:
        (i) an upper clamping arm;
        (ii) a lower clamping arm;
        (iii) a medial connecting portion interconnecting an end portion of said upper clamping arm and an end portion of said lower clamping arm;
    said upper clamping arm, said lower clamping arm and said medial connecting portion configured for receiving a portion of said tine support structure there between;
    said upper clamping arm comprising a pair of spaced longitudinally extending wall portions forming a longitudinally extending first channel there between, said first channel being open on at least an upper side and configured to receive said angled end portion of said tine member therein;
    said medial connecting portion comprising a second vertically extending channel configured for receiving said elongated body portion of said tine member there through and retaining said upper region of said elongated body portion therein;
    said lower clamping arm having a first opening there through located proximate a connection region of said end portion of said lower clamping arm to said medial connecting portion;
    wherein said first and second channels are in communication with each other;

wherein in operation said angled end portion of said tine member extends within said first channel; and wherein in operation said upper region of said elongated body portion of said tine member extends within said second channel and said elongated body portion extends through said first opening in said lower clamping arm;
a clamp tightening mechanism operable to exert a clamping force between said upper and lower clamping arms;
a tine angled portion engaging component operable to engage an upper surface of said angled end portion of said tine member;
wherein said tine member is operable to be securely held or is otherwise constrained by said clamping mechanism against or in close proximity to both said upper surface and said inward side surface, of said tine support structure;
wherein the upper and lower clamping arms comprise at least one upper ridge and at least one lower ridge located on an inner surface of each of the respective upper and lower clamping arms, in operation said at least one upper ridge and at least one lower ridge engaging in contact with a first portion and a second portion respectively of outward facing surface regions of the tine support structure.

2. An assembly as claimed in claim 1 wherein said upper and lower clamping arms are resiliently displaceable to be operable to receive said portion of said tine support structure between said upper and lower clamping arms, said medial connecting portion, and said at least one upper ridge and said at least one lower ridge.

3. An assembly as claimed in claim 1, wherein said clamp tightening mechanism comprises:
a clamping bolt extending in a perpendicular orientation to said upper and lower clamping arms and proximate said outward surface of said tine support structure, extending through a second opening in the lower clamping arm to and through an end portion in said first channel;
a clamping nut affixed to an end of said clamping bolt located proximate said end portion of said first channel and said clamping nut and clamping bolt are operable to exert a clamping force between said upper and lower clamping arms.

4. An assembly as claimed in claim 3 wherein said second opening is located proximate a distal end portion of said lower clamping arm.

5. An assembly as claimed in claim 1, wherein movement of said angled end portion is constrained by said tine angled portion engaging component.

6. An assembly as claimed in claim 1, wherein said first channel is open on said lower side such that said angled end portion is held against or in close proximity to said tine support structure at said upper surface of said tine support structure by said clamping mechanism.

7. An assembly as claimed in claim 1 wherein said second channel is an open channel formed at an inner surface of said medial connecting portion; said second open channel being open on at least an inward facing side.

8. An assembly as claimed in claim 1, wherein said tine angled portion engaging component comprises said clamping nut engaging an upper surface of a distal end portion of said angled end portion of said tine member located proximate a distal end of said first channel.

9. An assembly as claimed in claim 1, wherein said tine angled portion engaging component comprises a channel end wall positioned at a junction area of said first channel and said second channel and said channel end wall being operable to engage an upper surface region of said tine member to apply a downward force on said tine member to retain said angled end portion within said first channel.

10. An assembly as claimed in claim 9 wherein an inner surface of said channel end wall is generally a quarter spherical dome cap in shape.

11. An assembly as claimed in claim 1, wherein said at least one upper ridge and said at least one lower ridge each comprise laterally spaced, first and second upper ridges located on the inner surfaces of the upper clamping arm and laterally spaced first and second lower ridges located on the inner surfaces of the lower clamping arm, each of said first and second upper ridges located on the inner surfaces of the upper clamping arm and laterally spaced first and second lower ridges operable to exert forces on respective first and second portions of the outward facing surface regions of the tine support structure.

12. An assembly as claimed in claim 11 wherein said respective first and second portions of the outward facing surface regions of the tine support structure are corner areas.

13. An assembly as claimed in claim 12 wherein as said clamping nut and clamping bolt exert said clamping force between said upper and lower clamping arms said laterally spaced, first and second upper ridges of said upper and lower clamping arms exert corresponding clamping forces on respective first and second portions of the outward facing surface regions of the tine support structure.

14. An assembly as claimed in claim 11, wherein as said clamping nut and said clamping bolt exert said clamping force between said upper and lower clamping arms, said laterally spaced, first and second upper ridges of said upper and lower clamping arms exert corresponding clamping forces on respective first and second corner regions at the junction of respective the top and bottom surfaces portions of the tine support structure, and the outward facing surface of the tine support structure.

15. An assembly as claimed in claim 1, wherein said angled end portion and said elongated body portion of said tine member are oriented at an interior angle of approximately 90 degrees to each other.

16. An assembly as claimed in claim 1, wherein the upper and lower ridges are generally v-shaped.

17. An assembly as claimed in claim 1, wherein said clamping mechanism is made from a stiff and resilient material, operable to permit said upper and lower clamping arms to deflect outwardly during installation of said clamping mechanism on said tine support structure.

18. An assembly as claimed in claim 1, wherein at least a lower portion of second opening in the lower clamping arm has a hexagonal cross section and comprises an opening tapered surface area which tapers inwards towards the top surface of the lower clamping arm, said opening tapered surface of said second opening corresponding in shape with a tapered surface of said head portion of said clamping nut, said tapered surface of said second opening frictionally interfacing with said tapered head portion to be operable to assist in retaining said clamping bolt in said second opening when said clamping nut is not present on said clamping bolt.

19. An assembly as claimed in claim 1, wherein said tine support structure has a generally square or rectangular cross-sectional profile.

20. An assembly as claimed in claim 1 wherein said first channel is capable of receiving substantially the entirety of said angled end portion of said tine member therein.

21. An agricultural implement assembly comprising:
a support frame comprising an elongated tine support structure;

a tine member comprising an elongated body portion and an angled end portion, wherein said angled end portion and an upper region of said elongated body portion of said tine member are oriented at an interior angle of between 85 degrees and 95 degrees to each other;

wherein said tine support structure comprises at least three side surfaces that are oriented at approximately 90 degrees to each other, and wherein said angled end portion of said tine member is capable of being held against or in close proximity to said tine support structure at an upper side surface of said three side surfaces of said tine support structure and said upper region of said elongated body portion of said tine member is capable of being held against or in close proximity to said tine support structure at an inner side surface of said at least three side surfaces of said tine support structure;

a clamping mechanism operable for securing said tine member to said tine support structure;

said clamping mechanism comprising:
(i) an upper clamping arm;
(ii) a lower clamping arm;
(iii) a medial connecting member interconnecting an end portion of said upper clamping arm and an end portion of said lower clamping arm;

said upper clamping arm, said lower clamping arm and said medial connecting member defining a space capable of receiving a portion of said tine support structure therein;

said upper clamping arm comprising a pair of spaced longitudinally extending portions forming a longitudinally extending first channel there between, said first channel being open on at least an upper side and capable of receiving said angled end portion of said tine member therein;

said medial connecting member configured with a second vertically extending channel capable of receiving said elongated body portion of said tine member there through and capable of retaining said upper region of said elongated body portion therein;

said lower clamping arm having a first opening there through located proximate a connection of said end portion of said lower clamping arm to said medial connecting member;

wherein said first and second channels are in communication with each other;

wherein in operation said angled end portion of said tine member is received within and extends within said first channel; and wherein in operation said upper region of said elongated body portion of said tine member extends within said second channel and said elongated body portion extends through said second opening in said lower clamping arm;

a clamp tightening mechanism operable to exert a clamping force between said upper and lower clamping arms;

wherein said tine member is operable to be securely held or is otherwise constrained by said clamping mechanism against or in close proximity to said tine support structure at both said upper surface and said inward side surface of said tine support structure;

wherein said clamping apparatus further comprises a channel end wall positioned at a junction area of said first channel and said second channel and said channel end wall extending over a portion of said first channel at said junction area and said channel end wall being operable to engage an upper surface region of said tine member to apply a downward force on, or otherwise constrain, said tine member to retain said angled end portion within said first channel.

22. An apparatus as claimed in 21 wherein said clamp tightening mechanism comprises:
a clamping bolt disposed through an aperture in the upper arm of the c-shaped structure and an aperture in the lower arm of the c-shaped structure, adjacent to the upper and lower ridges; a clamping nut affixed at an end of said clamping bolt and operable to tighten said clamping mechanism.

23. An assembly as claimed in claim 21 wherein said first channel is capable of receiving substantially the entirety of said angled end portion of said tine member therein.

24. An assembly as claimed in claim 21, wherein said clamping mechanism is made from a stiff and resilient material, operable to permit said upper and lower clamping arms to deflect outwardly during installation of said clamping mechanism on said tine support structure to permit said channel end wall to be positioned over said upper surface region of said tine member.

25. A clamping apparatus for securing a tine of an agricultural implement, wherein said agricultural implement comprises:
a support frame comprising at least one transversely extending tine support structure on said support frame;
a tine member comprising an elongated body portion and an angled end portion, wherein said angled end portion and an upper region of said elongated body portion of said tine member are oriented at an interior angle of between 85 degrees and 95 degrees to each other;

wherein said tine support structure has at least three side surfaces that are oriented at approximately 90 degrees to each other;

wherein said angled end portion of said tine member is capable of being positioned above said tine support structure on an upper surface of said at least three side surfaces of said tine support structure;

wherein said clamping apparatus for securing said tine to said tine support structure comprises;
a first clamping arm;
a second clamping arm, said second clamping arm spaced from said first clamping arm;
a medial connecting portion interconnecting an end region of said first clamping arm and an end region of said second clamping arm;
said first clamping arm comprising a first channel that is generally open on an outer side;
said medial connecting portion comprising a second channel on an inward side;
said second clamping arm having a first opening there through located proximate a connection of said end region of said second clamping arm to said medial connecting portion; said second clamping arm having a second opening there through proximate a distal end region of said second clamping arm;
wherein said first and second channels are in communication with each other;
wherein in operation said angled end portion of said tine member is received within and extends within said first channel; and wherein said upper region of said elongated body portion of said tine member extends within said second channel and said elongated body portion extends through said first opening in said second clamping arm;

and wherein said clamping apparatus further comprises:
a clamping bolt that extends through said second opening in the second clamping arm to and through an end portion in said first channel;

a clamping nut affixed at an end of said clamping bolt and having a head portion that engages an upper surface of an end portion of said angled portion of said tine located proximate said distal end of said first channel;
wherein at least a lower portion of second opening in the second clamping arm has an hexagonal cross section and comprises an opening tapered surface area which provides a recess that tapers inwards towards an inward surface of the second clamping arm, said opening taper surface corresponding in shape with a tapered surface of said head portion of said clamping nut, said tapered surface of said second opening frictionally interfacing with said tapered head portion to be operable to assist in retaining said clamping bolt in said second opening when said clamping nut is not present on said clamping bolt.

26. An apparatus as claimed in claim 25 wherein said first clamping arm is an upper clamping arm and said second clamping arm is a lower clamping arm, and said tapered surface of said second opening frictionally interfacing with said tapered head portion is operable to resist rotation of said head portion of said clamping nut during rotation of said clamping nut onto said end of said clamping bolt.

27. An apparatus as claimed in claim 26 wherein said second constraining device comprises a channel capable of constraining an upper region of the elongated body portion of the tine member.

28. An apparatus as claimed in claim 21, wherein said interior angle is approximately 90 degrees.

29. An agricultural implement assembly comprising:
a support frame comprising an elongated tine support structure;
a tine member comprising an elongated body portion and an angled end portion, wherein said angled end portion and an upper region of said elongated body portion of said tine member are oriented at an interior angle of between 85 degrees and 95 degrees to each other;
wherein said tine support structure has at least three side surfaces that are oriented at approximately 90 degrees to each other, and wherein in operation said angled end portion of said tine member is held against or in close proximity to said tine support structure at an upper side surface of said three side surfaces of said tine support structure, and in operation said upper region of said elongated body portion of said tine member is held against or in close proximity to said tine support structure at an inner side surface of said three side surfaces of said tine support structure;
said assembly further comprising a clamping apparatus;
wherein the clamping apparatus comprises a generally c-shaped structure accommodating at least a portion of said tine support structure there between, an upper arm of the c-shaped structure comprising an open top, elongated first channel for in operation constraining said angled portion of the tine member therein, a medial connecting portion comprising a second channel in operation constraining an upper region of the elongated body portion of the tine member therein, the lower arm of the c-shaped structure comprising an aperture in operation receiving the elongated body portion there through;
said clamping apparatus further comprising:
a tine angled portion engaging component operable to engage an upper surface of said angled end portion of said tine member;
a clamp tightening mechanism operable to exert a clamping force between said upper and lower arms;
wherein said tine angled portion engaging component comprises a channel end wall positioned at a junction area of said first channel and said second channel and said channel end wall extending over a portion of said first channel at said junction area and said channel end wall being operable to engage an upper surface region of said tine member to apply a downward force on, or otherwise constrain, said tine member to retain said angled end portion within said first channel.

30. An apparatus as claimed in claim 29 wherein said interior angle is approximately 90 degrees.

31. An agricultural implement comprising:
a support frame comprising an elongated tine support structure;
a tine member comprising an elongated body portion and an angled end portion, wherein said angled end portion and an upper region of said elongated body portion of said tine member are oriented at an interior angle of between 85 degrees and 95 degrees to each other;
wherein said tine support structure has at least three side surfaces that are oriented at approximately 90 degrees to each other, and wherein said angled end portion of said tine member is configured to be held against or in close proximity to said tine support structure at an upper side surface of said three side surfaces of said tine support structure and said upper region of said elongated body portion of said tine member is configured to be held against or in close proximity to said tine support structure at an inner side surface of said three side surfaces of said tine support structure;
said assembly further comprising a clamping mechanism;
wherein the clamping mechanism comprises a generally c-shaped structure accommodating at least a portion of said tine support structure there between; a first arm of the c-shaped structure comprising a first, open top, elongated constraining device operable for constraining said angled portion of the tine member therein at a upper surface area of said of first arm; a medial connecting portion comprising a second constraining device operable for constraining an upper region of the elongated body portion of the tine member therein at an inward surface of said medial connecting portion;
the first arm and the second arm of the c-shaped structure comprising first and second openings operable for receiving the elongated body portion there through;
said clamping mechanism further comprising:
a tine angled portion engaging component operable to engage an upper surface of said angled end portion of said tine member when said angled end portion of said tine member is constrained by the first constraining device;
at least one ridge located on an inner surface of said first arm of the c-shaped structure and at least one ridge located on an inner surface of said second arm of the c-shaped structure, said at least one ridge of said first arm operable for engagement with a first rear region of said tine support structure and the at least one ridge of the second arm operable for engagement with a second opposite rear region of the tine support structure;
a clamp tightening mechanism operable to exert a clamping force between said first and second arms.

32. An apparatus as claimed in claim 31, wherein the first constraining device comprises an open top, elongated channel for constraining said angled portion of the tine member therein.

33. An agricultural implement comprising:
a support frame comprising an elongated tine support structure;
a tine member comprising an elongated body portion and an angled end portion, wherein said angled end portion and an upper region of said elongated body portion of said tine member are oriented at an interior angle of between 85 degrees and 95 degrees to each other;

wherein said tine support structure has at least three side surfaces that are oriented at approximately 90 degrees to each other, and wherein, in operation, said angled end portion of said tine member is held against or in close proximity to said tine support structure at an upper side surface of said three side surfaces of said tine support structure, and in operation, said upper region of said elongated body portion of said tine member is held against or in close proximity to said tine support structure at an inner side surface of said three side surfaces of said tine support structure;

said assembly further comprising a clamping apparatus comprising: a generally c-shaped structure, in operation accommodating at least a portion of said tine support structure there between; a first arm of the c-shaped structure, said first arm comprising a first constraining device, in operation, constraining said angled portion of the tine member therein; a medial connecting portion connecting said upper arm and a second arm of said generally c-shaped structure;

said first arm, said first constraining device, said second arm and said medial connecting portion, in operation, constraining said upper region of the elongated body portion of the tine member proximate a first side surface of said tine support structure;

said first arm comprising an aperture, in operation, receiving the elongated body portion there through;

said second arm comprising an aperture, in operation, receiving a portion of the elongated body portion there through;

said clamping apparatus further comprising:
    at least one ridge located on an inner surface of said first arm of the c-shaped structure and at least one ridge located on an inner surface of said second arm of the c-shaped structure, said at least one ridge of said first arm, in operation, providing locking engagement with a first rear corner region of said tine support structure and the at least one ridge of the second arm, in operation, providing locking engagement with a second opposite rear corner region of the tine support structure;
    a clamp tightening mechanism operable to exert a clamping force between said upper and lower arms when a during operation, said tine support structure is accommodated there between;
    a tine angled portion retaining component, in operation, retaining said angled end portion of said tine member within said first constraining device when said angled end portion is constrained by said first constraining device, and said clamping force is applied between said upper and lower clamping arms when, during operation, said tine support structure is accommodated there between;

wherein said tine member is, in operation, constrained by said clamping apparatus against or in close proximity to said tine support structure at both a second surface area of said tine support structure and said first side surface area of said tine support structure.

34. An implement as claimed in claim 33 wherein the first constraining device comprises an open top, elongated channel, in operation, constraining said angled portion of the tine member therein.

35. An agricultural implement comprising:
    a support frame comprising an elongated tine support structure;
    a plurality of tine members positioned in spaced relation to each other along a length of said tine support structure;
    a plurality of clamping apparatuses operable to connect said plurality of tine members in said spaced relation to each other along said length of said tine support structure;

wherein each tine member of said plurality of tine members comprises an upper angled portion and an elongated body portion oriented at an interior angle to said angled portion;

wherein each clamping apparatus of the plurality of clamping apparatuses comprises: a generally c-shaped structure configured for accommodating at least a portion of said tine support structure there between; an upper arm of the c-shaped structure comprising an open top elongated gap, in operation, receiving and constraining said angled portion of a respective tine member therein; a medial connecting portion connecting said upper arm and a lower arm of said generally c-shaped structure, said upper arm, said lower arm and said medial connecting portion in operation constraining said upper region of the elongated body portion of the respective tine member proximate a first-side surface of said tine support structure;

said upper arm comprising an aperture in operation receiving the elongated body portion of the respective tine member there through;

said lower arm comprising an aperture in operation receiving a portion of the elongated body portion of the respective tine member there through;

each said clamping apparatus further comprising:
    a clamp tightening mechanism in operation exerting a clamping force between said upper and lower arms when, during operation, said tine a support structure is accommodated there between;
    a tine angled portion retaining component in operation retaining said angled end portion of said respective tine member within said gap when said angled end portion is received in said gap and said clamping force is applied between said upper and lower clamping arms when, during operation, said tine support structure is accommodated there between;

wherein each said respective tine member is, in operation, constrained by said respective clamping apparatus against or in close proximity to said support structure at both a second surface area of said tine support structure and said first side surface area of said tine support structure;

wherein said tine angled portion engaging component of each clamping apparatus comprises an end wall positioned at a junction area of said open top gap and said medial connecting portion, and said end wall extending over a portion of said open top gap at said junction area and said end wall in operation engaging an upper surface region of said respective tine member to apply a downward force on, or otherwise constrain, said respective tine member to retain said angled end portion within said respective open top gap.

36. An agricultural implement comprising:
    a support frame comprising a support structure;
    a plurality of tine members positioned in spaced relation to each other along a length of said support structure;
    a plurality of clamping apparatuses operable to connect said plurality of tine members in said spaced relation to each other along said length of said support structure;

wherein each tine member of said plurality of tine members comprises an upper angled portion and an elongated body portion oriented at an interior angle to said angled portion;

and wherein each clamping apparatus of the plurality of clamping apparatuses comprises: a generally c-shaped structure operable to accommodate at least a portion of said support structure there between, a first arm of the c-shaped structure comprising a first, open top, elongated constraining device in operation constraining said angled portion of a respective tine member therein at a upper surface area of said of first arm; a medial connecting portion comprising a second constraining device, in operation, constraining an upper region of the elongated body portion of respective tine member therein at an inward surface of said medial connecting portion;

the first arm and the second arm of the c-shaped structure comprising first and second openings, in operation, receiving the elongated body portion there through;

each said clamping apparatus further comprising:
- a tine angled portion engaging component, in operation, engaging an upper surface of said angled end portion of said respective tine member when said angled end portion of said tine member is constrained by said first constraining device;
- at least one ridge located on an inner surface of said first arm of the c-shaped structure and at least one ridge located on an inner surface of said second arm of the c-shaped structure, said at least one ridge of said first arm, in operation, providing engagement with a first rear corner region of said support structure and the at least one ridge of the second arm, in operation, providing engagement with a second opposite rear corner region of the support structure;

a clamp tightening mechanism, in operation, exerting a clamping force between said first and second arms.

37. An implement as claimed in claim 36, wherein for each of said clamping apparatuses, said at least one ridge of said first arm, in operation, provides locking engagement with the first rear corner region of said tine support structure and the at least one ridge of the second arm, in operation, provides locking engagement with the second opposite rear corner region of the tine support structure.

38. An implement as claimed in claim 31, wherein said tine support structure has a generally square or rectangular cross-sectional profile.

39. An implement as claimed in claim 33, wherein said tine support structure has a generally square or rectangular cross-sectional profile.

40. An implement as claimed in claim 35, wherein said tine support structure has a generally square or rectangular cross-sectional profile.

41. An implement as claimed in claim 36, wherein said support structure has a generally square or rectangular cross-sectional profile.

42. An agricultural implement comprising:
- a support frame comprising a support structure, wherein said tine support structure has at least three side surfaces that are oriented at approximately 90 degrees to each other;
- a plurality of tine members positioned in spaced relation to each other along a length of said support structure;
- a plurality of clamping apparatuses, in operation, connecting said plurality of tine members in said spaced relation to each other along said length of said support structure;

wherein each tine member of said plurality of tine members comprises an upper angled portion and an elongated body portion oriented at an interior angle to said angled portion; and wherein each clamping apparatus of the plurality of clamping apparatuses comprises: a generally c-shaped structure, in operation, accommodating at least a portion of said tine support structure there between; a first arm of the c-shaped structure comprising a first, open top, elongated constraining device, in operation, constraining said angled portion of a respective tine member therein at a upper surface area of said of first arm; a medial connecting portion comprising a second constraining device, in operation, constraining an upper region of the elongated body portion of respective tine member therein at an inward surface of said medial connecting portion;

the first arm and the second arm of the c-shaped structure comprising first and second openings, in operation, receiving the elongated body portion there through;

each said clamping apparatus further comprising:
- a tine angled portion engaging component, in operation, engaging an upper surface of said angled end portion of said respective tine member when said angled end portion of said tine member is constrained by said first constraining device;
- at least one ridge located on an inner surface of said first arm of the c-shaped structure and at least one ridge located on an inner surface of said second arm of the c-shaped structure, said at least one ridge of said first arm in operation, engaging with a first rear region of said tine support structure and the at least one ridge of the second arm, in operation, engaging with a second opposite rear region of the tine support structure;

a clamp tightening mechanism, in operation, exerting a clamping force between said first and second arms.

43. An implement as claimed in claim 42, wherein for each clamping apparatus, said at least one ridge of said first arm, in operation, provides locking engagement with the first rear region of said tine support structure and the at least one ridge of the second arm, in operation, provides locking engagement with the second opposite rear region of the tine support structure.

44. An implement as claimed in claim 42, wherein the first rear region is a first rear corner region and said second rear region is a second corner region, and wherein said support structure has a generally square or rectangular cross-sectional profile.

45. An implement as claimed in claim 31, wherein said at least one ridge of said first arm, in operation, provides locking engagement with the first rear corner region of said tine support structure and the at least one ridge of the second arm, in operation, provides locking engagement with the second opposite rear corner region of the tine support structure.

46. An apparatus as claimed in claim 25, wherein said angled end portion and said elongated body portion of said tine member are configured at an interior angle of approximately 90 degrees to each other.

47. An implement assembly as claimed in claim 31, wherein said angled end portion and said elongated body portion of said tine member are configured at an interior angle of approximately 90 degrees to each other.

48. An implement as claimed in claim 33, wherein said angled end portion and an upper region of said elongated body portion of said tine member are configured at an interior angle of approximately 90 degrees to each other.

49. An implement as claimed in claim 35, wherein for each tine member of said plurality of tine members said interior angle is approximately 90 degrees.

50. An implement as claimed in claim 36, wherein for each tine member of said plurality of tine members said interior angle is approximately 90 degrees.

51. An implement as claimed in claim 42, wherein for each tine member of said plurality of tine members said interior angle is in the range of 85 degrees to 95 degrees.

52. An implement as claimed in claim 31, wherein said upper and lower clamping arms are resiliently displaceable to be operable to receive said portion of said tine support structure between said upper and lower clamping arms, said medial connecting portion, and said at least one upper ridge and said at least one lower ridge.

53. An implement as claimed in claim 33, wherein said upper and lower clamping arms are resiliently displaceable to be operable to receive said portion of said tine support structure between said upper and lower clamping arms, said medial connecting portion, and said at least one upper ridge and said at least one lower ridge.

54. An implement as claimed in claim 36, for each clamping apparatus, the first arm and the second arm of the c-shaped structure of each clamping apparatus are resiliently displaceable to be operable to receive said portion of said tine support structure between said upper and lower clamping arms, said medial connecting portion, and said at least one upper ridge and said at least one lower ridge, of each clamping apparatus.

55. An implement as claimed in claim 42, wherein the first arm and the second arm of the c-shaped structure of each clamping apparatus are resiliently displaceable to be operable to receive said portion of said tine support structure between said upper and lower clamping arms, said medial connecting portion, and said at least one upper ridge and said at least one lower ridge, of each clamping apparatus.

* * * * *